(12) United States Patent
Feldkamp

(10) Patent No.: US 12,241,488 B1
(45) Date of Patent: Mar. 4, 2025

(54) CYLINDER DEVICE

(71) Applicant: Hitachi Astemo, Ltd., Ibaraki (JP)

(72) Inventor: Andrew Feldkamp, Dexter, MI (US)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/584,327

(22) Filed: Feb. 22, 2024

(51) Int. Cl.
   F15B 15/22 (2006.01)
   F16J 1/00 (2006.01)
   F16J 9/12 (2006.01)

(52) U.S. Cl.
   CPC .......... *F15B 15/22* (2013.01); *F16J 1/00* (2013.01); *F16J 9/12* (2013.01)

(58) Field of Classification Search
   CPC ...... F15B 15/22; F15B 15/223; F15B 15/224; F15B 15/227
   See application file for complete search history.

(56) References Cited

U.S. PATENT DOCUMENTS

| | | | | |
|---|---|---|---|---|
| 3,175,645 A | * | 3/1965 | Schafer | F16F 9/49 188/282.6 |
| 3,447,644 A | * | 6/1969 | Duckett | F16F 9/48 188/315 |
| 4,323,427 A | * | 4/1982 | Jamrus | F15B 15/227 376/230 |
| 5,157,806 A | * | 10/1992 | Wartian | F16F 9/516 16/84 |
| 6,758,127 B2 | * | 7/2004 | Schult | F15B 15/1414 91/394 |
| 7,337,885 B2 | * | 3/2008 | Stow | F16F 9/49 188/289 |
| 7,395,749 B2 | * | 7/2008 | Adams | F15B 15/227 91/395 |
| 9,784,292 B1 | * | 10/2017 | Kunigk | F15B 15/223 |
| 11,668,367 B2 | * | 6/2023 | Kasprzyk | F16F 9/185 188/284 |
| 2015/0247549 A1 | | 9/2015 | Takeno et al. | |
| 2015/0330475 A1 | | 11/2015 | Slusarczyk et al. | |

FOREIGN PATENT DOCUMENTS

JP  2015-161404 A  9/2015

* cited by examiner

*Primary Examiner* — Michael Leslie
(74) *Attorney, Agent, or Firm* — MATTINGLY & MALUR, PC

(57) ABSTRACT

The cylinder device includes a first piston fitted in a first cylinder to be slidable, a piston rod connected to the first piston, and a stopper mechanism which operates when the first piston reaches a predetermined position on a first end portion side of one axial end of the first cylinder during an extension stroke or a compression stroke, in which the stopper mechanism includes a second cylinder provided on the first end portion side of the first cylinder and a second piston provided to be movable according to movement of the piston rod and able to fit into the second cylinder, and one end of the second piston on the first end portion side comes into contact with a rod flange part between a rod first outer diameter part of the piston rod and a rod second outer diameter part.

7 Claims, 9 Drawing Sheets

CYLINDER DEVICE

TECHNICAL FIELD

The present invention relates to a cylinder device.

BACKGROUND ART

There is a cylinder device in which a damping force increases when a piston rod reaches a predetermined range on a limit side during an extension stroke in which the piston rod extends out of a cylinder or during a compression stroke in which the piston rod is pushed into the cylinder (for example, see Japanese Unexamined Patent Application, First Publication No. 2015-161404 and United States Patent Application, Publication No. 2015/0330475).

Incidentally, there has been a demand to enhance durability in cylinder devices.

Therefore, an objective of the present invention is to provide a cylinder device in which durability can be enhanced.

SUMMARY OF INVENTION

Solution to Problem

In order to achieve the above-described objective, one aspect of a cylinder device of the present invention includes a first cylinder in which a working fluid is sealed, a first piston fitted in the first cylinder to be slidable and partitioning an inside of the first cylinder, a piston rod connected to the first piston, and a stopper mechanism operating when the first piston reaches a predetermined position on a first end portion side of one axial end of the first cylinder during an extension stroke or a compression stroke, in which the stopper mechanism includes a second cylinder provided on the first end portion side of the first cylinder and having a smaller diameter than the first cylinder, and a second piston provided to be movable according to movement of the piston rod and able to fit into the second cylinder, one end of the second piston on the first end portion side comes into contact with a rod flange part between a rod first outer diameter part of the piston rod and a rod second outer diameter part which is on a side of the rod first outer diameter part opposite to the first end portion and has a smaller diameter than the rod first outer diameter part, and the other end of the second piston on a side opposite to the first end portion is biased by a biasing part which biases the second piston toward the rod flange part.

Advantageous Effects of Invention

According to the above-described aspect of the present invention, durability can be enhanced.

DESCRIPTION OF EMBODIMENTS

Figure 1:
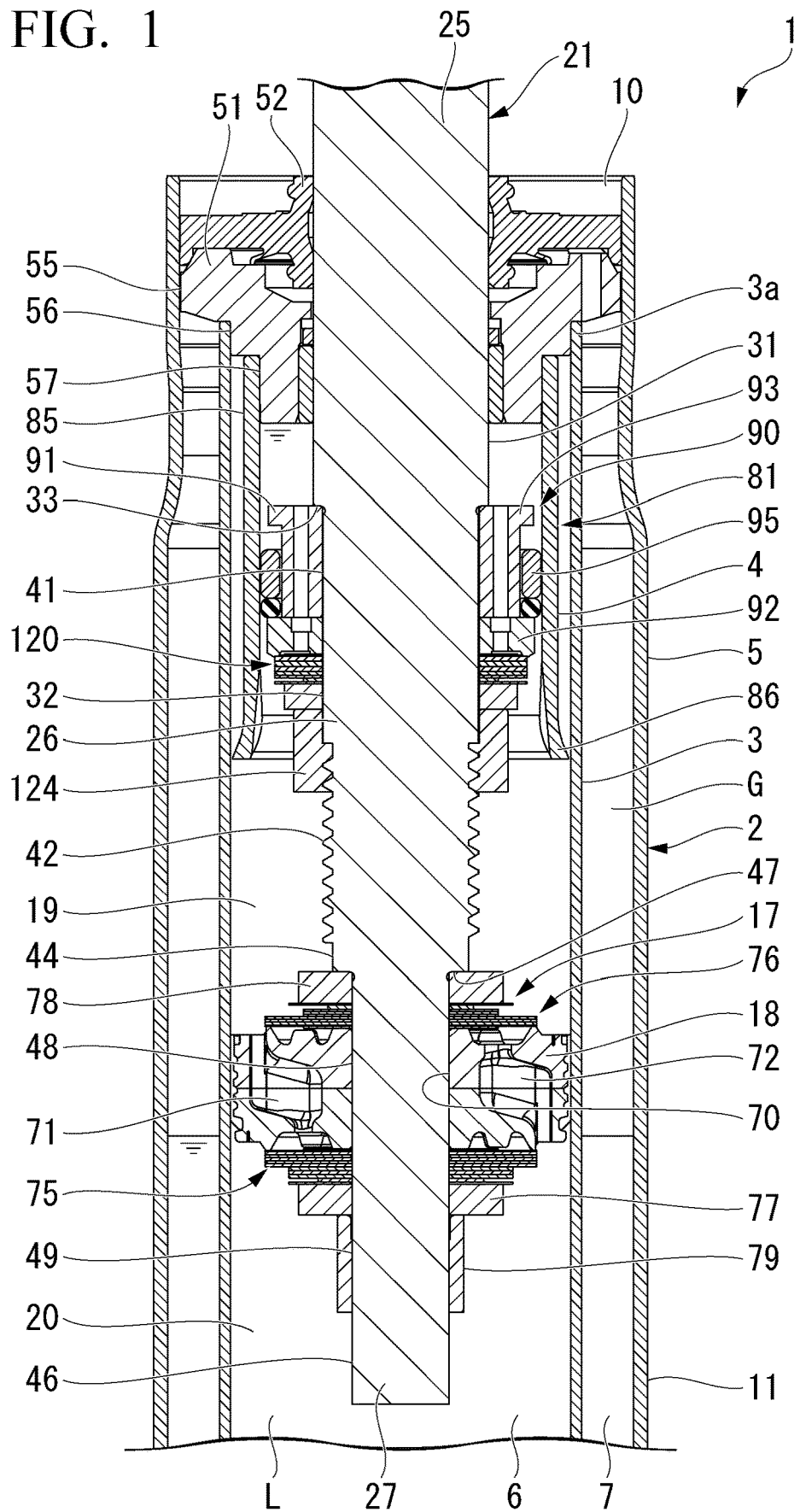
FIG. 1 is a cross-sectional view of a main part of a cylinder device of a first embodiment according to the present invention.

A cylinder device of an embodiment according to the present invention will be described on the basis of the drawings. Further, in the following, for convenience of explanation, an upper side in the drawing will be referred to using "upper" and a lower side in the drawing will be referred to using "lower" in FIGS. 1, 2, 4, 6, 7, 9, 11, 13, and 15.

First Embodiment

A cylinder device of a first embodiment according to the present invention will be described on the basis of FIGS. 1 to 8.

As illustrated in FIG. 1, a cylinder device 1 of the first embodiment is a dual-tube type hydraulic shock absorber. The cylinder device 1 is used in suspension devices of vehicles, specifically, automobiles. The cylinder device 1 includes a cylinder 2. The cylinder 2 includes a first cylinder 3, a second cylinder 4, and a shell 5. The first cylinder 3 and the second cylinder 4 have a cylindrical shape. The shell 5 has a bottomed cylindrical shape.

The second cylinder 4 has an outer diameter smaller than an inner diameter of the first cylinder 3. The second cylinder 4 is disposed on a radially inward side from a first end portion 3a at an upper end which is one axial end of the first cylinder 3. A central axis of the first cylinder 3 and a central axis of the second cylinder 4 coincide with each other.

The shell 5 has an inner diameter larger than an outer diameter of the first cylinder 3. The first cylinder 3 is disposed on a radially inward side from the shell 5. The central axis of the first cylinder 3 and a central axis of the shell 5 coincide with each other. The inside of the first cylinder 3 is an inner chamber 6. A reservoir chamber 7 is provided between the first cylinder 3 and the shell 5. The second cylinder 4 is provided in the inner chamber 6.

The shell 5 includes a cylindrical barrel part 11 whose upper end, which is one axial end, is an opening 10, and a circular bottom part (not illustrated) that closes a lower end which is the other end of the barrel part 11 on a side opposite to the opening 10. The opening 10 of the shell 5 is positioned above an upper end which is one axial end of the first cylinder 3.

The cylinder device 1 includes a first piston assembly 17. The first piston assembly 17 is disposed inside the first cylinder 3 of the cylinder 2. The first piston assembly 17 includes a first piston 18. The first piston 18 of the first piston assembly 17 is fitted in the first cylinder 3 to be slidable. The first piston 18 partitions the inner chamber 6 in the first cylinder 3 into two chambers, a first chamber 19 on an upper side which is one side and a second chamber 20 on a lower side which is the other side. In an axial direction of the first cylinder 3, the first chamber 19 is on the opening 10 side of the shell 5 with respect to the first piston 18. In the axial direction of the first cylinder 3, the second chamber 20 is on a side opposite to the opening 10 of the shell 5 with respect to the first piston 18. In the cylinder 2, an oil fluid L is sealed as a working fluid in the inner chamber 6 inside the first cylinder 3. In the cylinder 2, the oil fluid L and a gas G are sealed as working fluids in the reservoir chamber 7 between the first cylinder 3 and the shell 5.

The cylinder device 1 includes a piston rod 21 connected to the first piston assembly 17 including the first piston 18.

A part of the piston rod 21 on one side in the axial direction is inserted into the shell 5 and the first cylinder 3 via the opening 10 at the upper end, which is one end of the shell 5 in the axial direction, and a part thereof on the other side in the axial direction extends to the outside from the shell 5 and the first cylinder 3.

The piston rod 21 includes a main shaft part 25 on an upper side that extends to the outside from the shell 5 and the first cylinder 3, a first mounting shaft part 26 on a side below the main shaft part 25, and a second mounting shaft part 27 on a side below the first mounting shaft part 26. In the piston rod 21, a lower portion of the main shaft part 25, the first mounting shaft part 26, and the second mounting shaft part 27, which are one end side in the axial direction, are disposed in the inner chamber 6 in the first cylinder 3 of the cylinder 2. In the piston rod 21, an upper portion of the main shaft part 25, which is the other end side in the axial direction, is disposed outside the cylinder 2. In other words, the piston rod 21 includes the main shaft part 25, the first mounting shaft part 26, and the second mounting shaft part 27 in order from an upper end portion side, in which the second cylinder 4 is provided, in the axial direction of the first cylinder 3.

A radially outer portion of the main shaft part 25 is a rod first outer diameter part 31 in which an outer circumferential surface has a cylindrical surface shape.

A radially outer portion of the first mounting shaft part 26 is a rod second outer diameter part 32. The rod second outer diameter part 32 has an outer diameter smaller than an outer diameter of the rod first outer diameter part 31. Thereby, the piston rod 21 includes a first rod flange part 33 (rod flange part) having a planar end surface facing downward and extending perpendicular to a central axis of the piston rod 21 between the rod first outer diameter part 31 and the rod second outer diameter part 32.

In the rod second outer diameter part 32 of the first mounting shaft part 26, an end portion on the main shaft part 25 side in the axial direction is a first fitting part 41 whose outer circumferential surface has a cylindrical surface shape, and a portion on a side of the first fitting part 41 opposite to the main shaft part 25 in the axial direction is a first male screw part 42 (biasing part, screw). In the rod second outer diameter part 32, a portion on a side of the first male screw part 42 opposite to the first fitting part 41 in the axial direction is an extension part 44 whose outer circumferential surface has a cylindrical surface shape. The first male screw part 42 has a screw thread diameter, which is a maximum diameter thereof, equal to or smaller than an outer diameter of the first fitting part 41. The extension part 44 has an outer diameter equal to or smaller than a screw valley diameter which is a minimum diameter of the first male screw part 42. The first rod flange part 33 is provided between the rod first outer diameter part 31 and the first fitting part 41 of the rod second outer diameter part 32.

A radially outer portion of the second mounting shaft part 27 is a rod third outer diameter part 46. The rod third outer diameter part 46 has an outer diameter smaller than an outer diameter of the extension part 44. Thereby, the piston rod 21 includes a second rod flange part 47 having a planar end surface facing downward and extending perpendicular to the central axis of the piston rod 21 between the first mounting shaft part 26 and the second mounting shaft part 27.

In the rod third outer diameter part 46 of the second mounting shaft part 27, a portion on the first mounting shaft part 26 side in the axial direction is a second fitting part 48 whose outer circumferential surface has a cylindrical surface shape, and a radially outer portion on a side opposite to the first mounting shaft part 26 in the axial direction is a second male screw part 49. The second male screw part 49 has a screw thread diameter, which is a maximum diameter thereof, equal to or smaller than an outer diameter of the second fitting part 48. The second rod flange part 47 is provided between the extension part 44 of the rod second outer diameter part 32 and the second fitting part 48 of the rod third outer diameter part 46.

The piston rod 21 is seamlessly and integrally formed of a single material in a shape described above. Therefore, in the piston rod 21, the rod first outer diameter part 31, the rod second outer diameter part 32, and the rod third outer diameter part 46 are integrally formed.

The first piston assembly 17 is attached to the second mounting shaft part 27 of the piston rod 21. The piston rod 21 to which the first piston assembly 17 is connected passes through the first chamber 19 and extends outward from the first cylinder 3, the second cylinder 4, and the shell 5, that is, from the cylinder 2. The first piston assembly 17 partitions the inner chamber 6 into the first chamber 19 on a side of the main shaft part 25 and first mounting shaft part 26, and the second chamber 20 on a side opposite to the main shaft part 25 and the first mounting shaft part 26 in the axial direction of the piston rod 21.

In the cylinder device 1, a portion of the piston rod 21 extending from the cylinder 2 is disposed at an upper portion to be connected to a vehicle body of a vehicle. At the same time, in the cylinder device 1, the barrel part 11 of the shell 5 is disposed at a lower portion to be connected to a wheel side of the vehicle.

The first piston 18 is fixed to the second mounting shaft part 27 of the piston rod 21. Therefore, the first piston 18 and the piston rod 21 move together. In the cylinder device 1, a stroke in which the piston rod 21 moves in a direction to increase an amount of extension thereof from the cylinder 2 is an extension stroke in which the entire length increases. In the cylinder device 1, a stroke in which the piston rod 21 moves in a direction to decrease an amount of extension thereof from the cylinder 2 is a compression stroke in which the entire length decreases. In the cylinder device 1, the first piston 18 moves to the first chamber 19 side during the extension stroke. In the cylinder device 1, the first piston 18 moves to the second chamber 20 side during the compression stroke.

A rod guide 51 is fitted into an upper end opening side of the first cylinder 3 and the upper end opening 10 side of the shell 5. A seal member 52 is fitted into the shell 5 on an upper side of the rod guide 51. Both the rod guide 51 and the seal member 52 are annular. In the piston rod 21, the rod first outer diameter part 31 of the main shaft part 25 is inserted through the radial inside of the rod guide 51 and the seal member 52. In the piston rod 21, the rod first outer diameter part 31 of the main shaft part 25 slides with respect to the rod guide 51 and the seal member 52 in the axial direction of them. The piston rod 21 extends from the inside of the cylinder 2 to the outside of the cylinder 2 from the seal member 52.

The rod guide 51 restricts movement of the piston rod 21 in a radial direction with respect to the first cylinder 3, the second cylinder 4, and the shell 5 of the cylinder 2. The piston rod 21 fits into the rod guide 51 at the rod first outer diameter part 31 of the main shaft part 25, and the first piston 18 fits into the first cylinder 3. Thereby, the central axis of the piston rod 21 and the central axis of the first cylinder 3 coincide with each other. The rod guide 51 supports the piston rod 21 to be movable in the axial direction of the piston rod 21. An outer circumferential portion of the seal member 52 is in close contact with the shell 5. An inner circumferential portion of the seal member 52 is in close contact with the rod first outer diameter part 31 of the main shaft part 25 of the piston rod 21. The piston rod 21 slides in the axial direction of the seal member 52 with respect to the seal member 52. The seal member 52 suppresses the oil fluid L in the inner chamber 6 and the high-pressure gas G and the oil fluid L in the reservoir chamber 7 leaking to the outside.

The rod guide 51 has a large diameter part 55, an intermediate diameter part 56, and a small diameter part 57 on an outer circumferential side thereof. The large diameter part 55 has an outer diameter larger than an outer diameter of the intermediate diameter part 56. The intermediate diameter part 56 has an outer diameter larger than an outer diameter of the small diameter part 57. In the rod guide 51, the intermediate diameter part 56 is provided on the first piston assembly 17 side with respect to, that is, on a side below, the large diameter part 55. In the rod guide 51, the small diameter part 57 is provided on the first piston assembly 17 side with respect to, that is, on a side below, the intermediate diameter part 56. The rod guide 51 is fitted to the inner circumferential portion of an upper end of the first cylinder 3 at the intermediate diameter part 56. At that time, the first end portion 3a, which is an upper end portion of the first cylinder 3, comes into contact with the large diameter part 55 of the rod guide 51 in the axial direction. The rod guide 51 is fitted to an upper inner circumferential portion of the barrel part 11 of the shell 5 at the large diameter part 55 on the upper side.

A body valve assembly (not illustrated) is placed to be positioned in the radial direction on a side opposite to the opening 10 in the axial direction of the shell 5, that is, on a bottom portion (not illustrated) on a lower side. The body valve assembly (not illustrated) fits a lower end portion of the first cylinder 3 while positioning it in the radial direction. The body valve assembly (not illustrated) partitions the second chamber 20 and the reservoir chamber 7.

An engaging part (not illustrated) that protrudes inward in the radial direction is formed at an upper end portion of the barrel part 11 of the shell 5. The seal member 52 is fixed to the cylinder 2 by being sandwiched between the engaging part (not illustrated) and the rod guide 51.

The main shaft part 25 of the piston rod 21 slides with respect to the rod guide 51 and the seal member 52 in the axial direction of them at the rod first outer diameter part 31.

The first piston assembly 17 is connected to the second mounting shaft part 27 of the piston rod 21 as described above.

A through hole 70 is formed at a center of the first piston 18 of the first piston assembly 17 in the radial direction. The through hole 70 penetrates the first piston 18 in the axial direction of the first piston 18. The second fitting part 48 of the rod third outer diameter part 46 of the second mounting shaft part 27 of the piston rod 21 is fitted in the through hole 70 of the first piston 18.

The first piston 18 includes a first passage 71 and a second passage 72 formed on an outer side of the through hole 70 in the radial direction of the first piston 18. The first passage 71 and the second passage 72 penetrate the first piston 18 in the axial direction of the first piston 18. A plurality of first passages 71 and a plurality of second passages 72 are formed in the first piston 18. The first passages 71 and the second passages 72 are alternately disposed in a circumferential direction of the first piston 18. Both the first passages 71 and the second passages 72 allow communication between the first chamber 19 and the second chamber 20.

The first piston assembly 17 includes a first damping valve 75 and a second damping valve 76.

The first damping valve 75 is a disc valve formed by laminating a plurality of annular discs. The second fitting part 48 of the rod third outer diameter part 46 of the second mounting shaft part 27 of the piston rod 21 is fitted to the inside of the first damping valve 75 in the radial direction. The first damping valve 75 is disposed on the second chamber 20 side of the first piston 18 in the axial direction of the piston rod 21. During the extension stroke in which the piston rod 21 moves to an extension side, a portion of the first damping valve 75 on an outer circumferential side separates from the first piston 18 and opens the first passage 71. Thereby, the first damping valve 75 allows the oil fluid L to flow from the first chamber 19 to the second chamber 20 through the first passage 71. At that time, the first damping valve 75 suppresses a flow of the oil fluid L to generate a damping force. The first damping valve 75 is provided in the first passage 71 to generate a damping force by suppressing a flow of the oil fluid L generated in the first passage 71 during the extension stroke. The first damping valve 75 closes the first passage 71 when the portion on the outer circumferential side comes into contact with the first piston 18. A fixed orifice (not illustrated) is provided at a portion between the first damping valve 75 and the first piston 18. The fixed orifice allows the oil fluid L to flow from the first chamber 19 to the second chamber 20 through the first passage 71 even if the portion on the outer circumferential side of the first damping valve 75 is in contact with the first piston 18.

The second damping valve 76 is a disc valve formed by laminating a plurality of annular discs. The second fitting part 48 of the rod third outer diameter part 46 of the second mounting shaft part 27 is fitted to the inside of the second damping valve 76 in the radial direction. The second damping valve 76 is disposed on the first chamber 19 side of the first piston 18 in the axial direction of the piston rod 21. During the compression stroke in which the piston rod 21 moves to a compression side, a portion of the second damping valve 76 on an outer circumferential side separates from the first piston 18 and opens the second passage 72. Thereby, the second damping valve 76 allows the oil fluid L to flow from the second chamber 20 to the first chamber 19 through the second passage 72. At that time, the second damping valve 76 suppresses a flow of the oil fluid L to generate a damping force. The second damping valve 76 is provided in the second passage 72 to generate a damping force by suppressing a flow of the oil fluid L generated in the second passage 72 during the compression stroke. The second damping valve 76 closes the second passage 72 when the portion on the outer circumferential side comes in contact with the first piston 18. A fixed orifice (not illustrated) is provided at a portion between the second damping valve 76 and the first piston 18. The fixed orifice allows the oil fluid L to flow from the second chamber 20 to the first chamber 19 through the second passage 72 even if the portion on the outer circumferential side of the second damping valve 76 is in contact with the first piston 18.

The first piston assembly 17 includes an annular restriction ring 77 that suppresses deformation of the first damping valve 75 beyond a specified limit when the first damping valve 75 opens on a side of the first damping valve 75 opposite to the first piston 18 in the axial direction. The second fitting part 48 of the rod third outer diameter part 46 of the second mounting shaft part 27 is fitted to the inside of the restriction ring 77 in the radial direction.

The first piston assembly 17 includes an annular restriction ring 78 that suppresses deformation of the second damping valve 76 beyond a specified limit when the second damping valve 76 opens on a side of the second damping valve 76 opposite to the first piston 18 in the axial direction. The second fitting part 48 of the rod third outer diameter part 46 of the second mounting shaft part 27 is fitted to the inside of the restriction ring 78 in the radial direction.

The first piston assembly 17 including the first piston 18, the first damping valve 75, the second damping valve 76, and the restriction rings 77 and 78 moves integrally with the piston rod 21 to generate a damping force when the piston rod 21 moves with respect to the first cylinder 3 in the axial direction of the first cylinder 3.

In the first piston assembly 17, the restriction ring 78 at an upper end, which is one axial end, is in contact with the second rod flange part 47 of the piston rod 21, and the restriction ring 77 at a lower end, which is the other axial end, is in contact with a nut 79 that is screwed onto the second male screw part 49 of the rod third outer diameter part 46 of the second mounting shaft part 27 of the piston rod 21. When the nut 79 is fastened to the second male screw part 49 of the second mounting shaft part 27, the first piston assembly 17 is biased toward the second rod flange part 47 to be brought into contact with the second rod flange part 47 by a fastening axial force of the nut 79. In the piston rod 21, an outer diameter portion of the second rod flange part 47 that receives the biasing force by the nut 79 is the extension part 44 whose outer circumferential surface has a cylindrical surface shape.

The second cylinder 4 constitutes a stopper mechanism 81 that operates when the first piston 18 reaches a predetermined position on one end side of the first cylinder 3 in the axial direction. The stopper mechanism 81 operates when the first piston 18 reaches a predetermined position on the extension side of the first cylinder 3, that is, on the first end portion 3a side, which is the upper end, during the extension stroke of the cylinder device 1. The stopper mechanism 81 includes the second cylinder 4 that is provided on the first end portion 3a side of the first cylinder 3 and has a smaller diameter than the first cylinder 3.

The second cylinder 4 is fitted and connected to the small diameter part 57 of the rod guide 51. The second cylinder 4 has a cylindrical shape. The second cylinder 4 is disposed inside the first cylinder 3 in the radial direction. The second cylinder 4 is fixed to the rod guide 51 by fitting an inner circumferential portion of an upper end portion on the first end portion 3a side into the small diameter part 57 of the rod guide 51. At that time, the first end portion 3a of the second cylinder 4 comes into contact with the intermediate diameter part 56 of the rod guide 51 in the axial direction. Also, at that time, the central axis of the second cylinder 4 and the central axis of the first cylinder 3 coincide with each other. The second cylinder 4 is disposed in the first chamber 19 with a radial gap between itself and the first cylinder 3.

Figure 2:
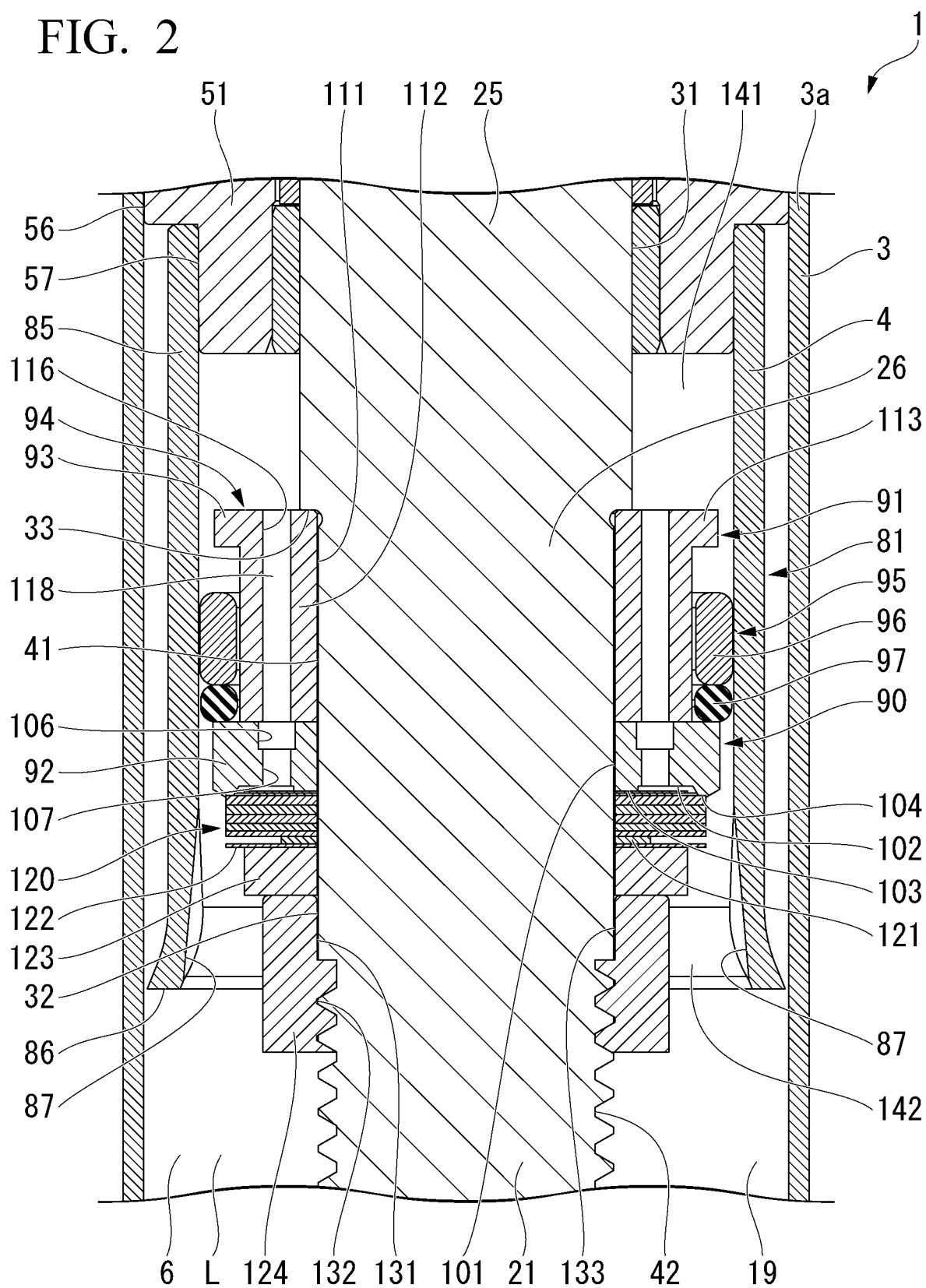
FIG. 2 is a cross-sectional view illustrating a stopper mechanism of the cylinder device of the first embodiment according to the present invention.

As illustrated in FIG. 2, the second cylinder 4 includes a cylindrical part 85 and an enlarged diameter part 86.

The cylindrical part 85 has a cylindrical shape with a constant inner diameter and a constant outer diameter, and is provided from one end portion on the first end portion 3a side, that is, an upper end portion, to the other end side, that is, an intermediate portion on a lower end side in an axial direction of the second cylinder 4. In the second cylinder 4, the one end portion of the cylindrical part 85 in the axial direction fits into the small diameter part 57 of the rod guide 51. In the second cylinder 4, the other end portion on a side opposite to the first end portion 3a from an intermediate portion of the cylindrical part 85 in the axial direction extends downward from the rod guide 51.

The enlarged diameter part 86 is provided at the other end portion of the second cylinder 4 on a side opposite to the first end portion 3a in the axial direction, that is, at a lower end portion. An inner diameter of the enlarged diameter part 86 increases toward the lower end. An outer diameter of the enlarged diameter part 86 increases toward the lower end. The enlarged diameter part 86 increases in diameter in a direction away from the cylindrical part 85 in the axial direction of the second cylinder 4. The second cylinder 4 opens to a side opposite to the first end portion 3a in the axial direction, that is, opens downward.

A groove 87 extending in the axial direction of the second cylinder 4 is provided in the second cylinder 4 at an inner circumferential portion on a side opposite to the first end portion 3a in the axial direction. The groove 87 is provided at an inner circumferential portion of the second cylinder 4 on a lower end side. The groove 87 is recessed outward in a radial direction of the second cylinder 4 from an inner circumferential surface of the second cylinder 4. The groove 87 extends from the enlarged diameter part 86 to an end portion of the cylindrical part 85 on a side opposite to the first end portion 3a, that is, to the lower end portion. A plurality of grooves 87 are provided in the second cylinder 4 at regular intervals in a circumferential direction of the second cylinder 4. The plurality of grooves 87 have different lengths from the lower end of the second cylinder 4. In other words, the plurality of grooves 87 have different lengths in the axial direction of the second cylinder 4.

The stopper mechanism 81 includes a second piston assembly 90 attached to the piston rod 21. The second piston assembly 90 includes a second piston 91. The second piston 91 includes a second piston main body 94 having two parts, a third piston 92 (first restriction part) and a fourth piston 93 that is separate from the third piston 92, and a piston ring 95. The piston ring 95 includes a piston ring main body 96 and a seal ring 97.

Figure 3:
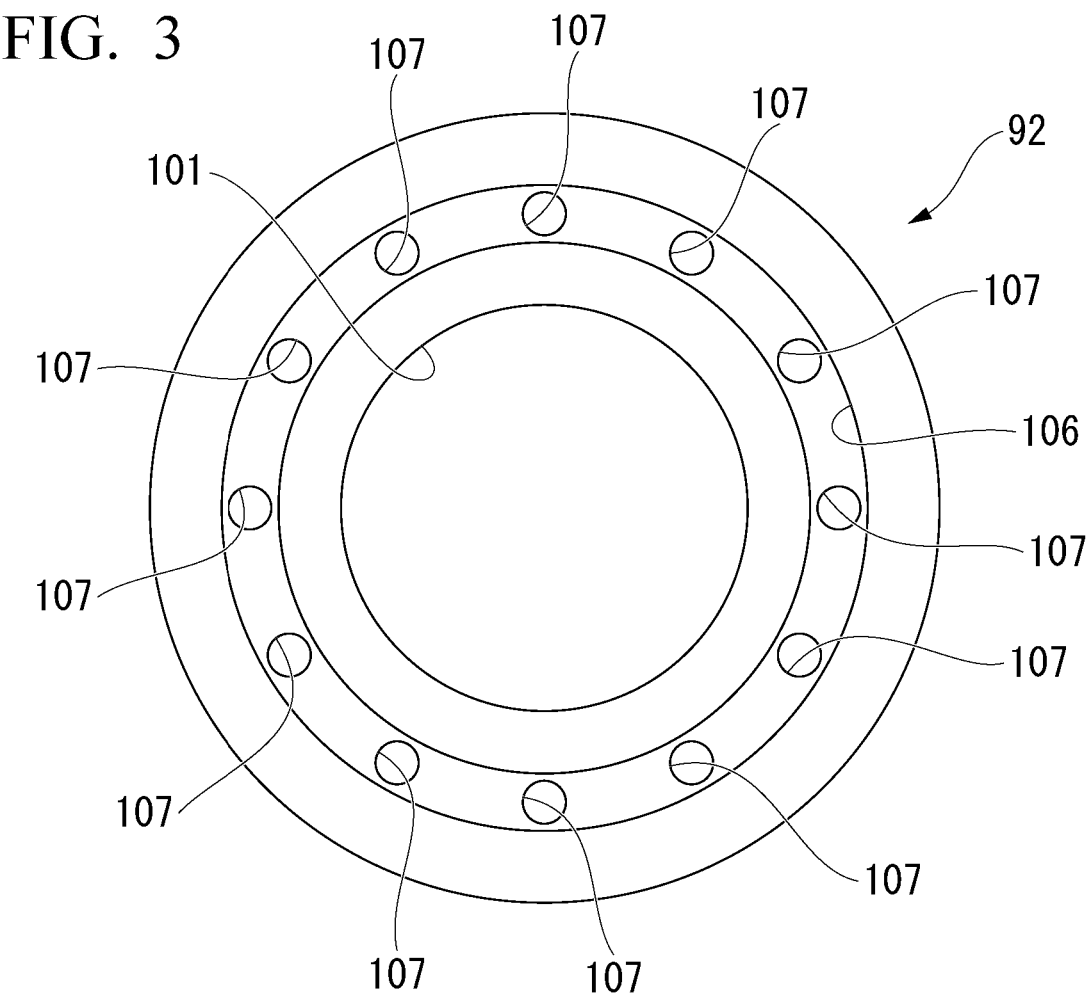
FIG. 3 is a plan view illustrating a third piston of the cylinder device of the first embodiment according to the present invention.
Figure 4:
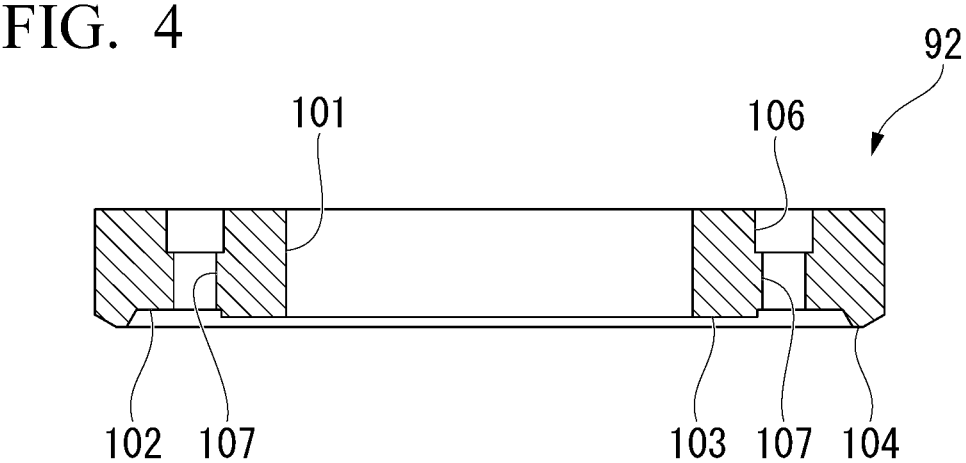
FIG. 4 is a cross-sectional view illustrating the third piston of the cylinder device of the first embodiment according to the present invention.
Figure 5:
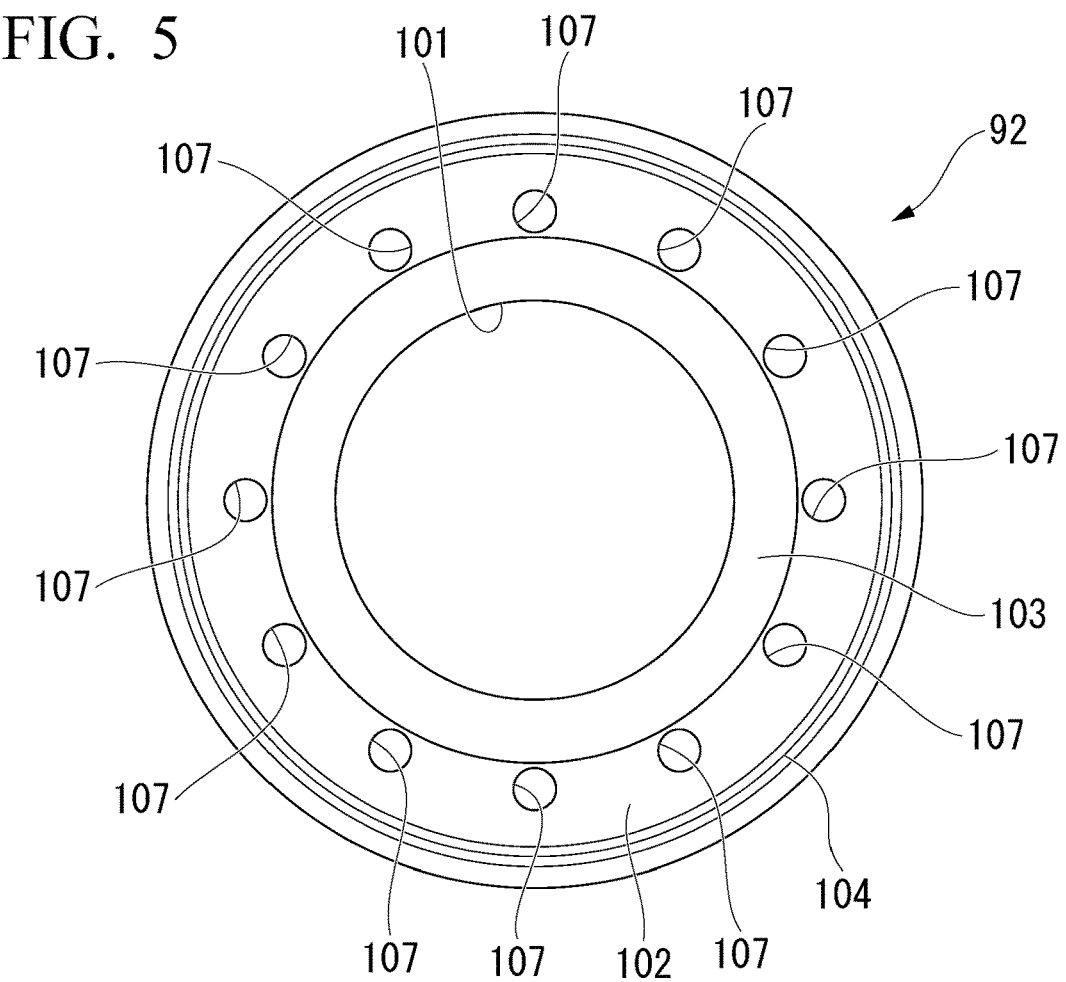
FIG. 5 is a bottom view illustrating the third piston of the cylinder device of the first embodiment according to the present invention.

The third piston 92 of the second piston main body 94 is integrally formed seamlessly and has the shape illustrated in FIGS. 3 to 5. The third piston 92 has a bored disc shape in which a through hole 101 penetrating in the axial direction is formed at a center in the radial direction. As illustrated in FIGS. 4 and 5, a recessed groove 102 having an annular shape that is coaxial with the through hole 101 and recessed inward in the axial direction is formed in the third piston 92 on a radially outward side from the through hole 101 at an end portion on one end side in the axial direction. As illustrated in FIG. 4, in the third piston 92, an inward side of the recessed groove 102 in the radial direction at the end portion on one end side in the axial direction is an inner seat part 103 that protrudes outward in the axial direction with respect to a bottom surface of the recessed groove 102. The inner seat part 103 is provided to surround the through hole 101 from the outside in the radial direction. In the third piston 92, an outward side of the recessed groove 102 in the radial direction at the end portion on one end side in the axial direction is a valve seat part 104 that protrudes outward in the axial direction with respect to the bottom surface of the recessed groove 102. The valve seat part 104 has a protrusion height from the bottom surface of the recessed groove 102 higher than that of the inner seat part 103.

An annular groove 106 having an annular shape that is coaxial with the through hole 101 and recessed inward in the axial direction as illustrated in FIGS. 3 and 4 is formed in the third piston 92 on a radially outward side from the through hole 101 at the other side opposite to the inner seat part 103 and the valve seat part 104 in the axial direction. A passage hole 107 connecting a bottom surface of the annular groove 106 and the bottom surface of the recessed groove 102, and extending in an axial direction of the third piston 92 is formed in the third piston 92. A plurality of passage holes 107 of the same shape are formed in the third piston 92 at regular intervals in a circumferential direction of the third piston 92 as illustrated in FIGS. 3 and 5.

Figure 6:
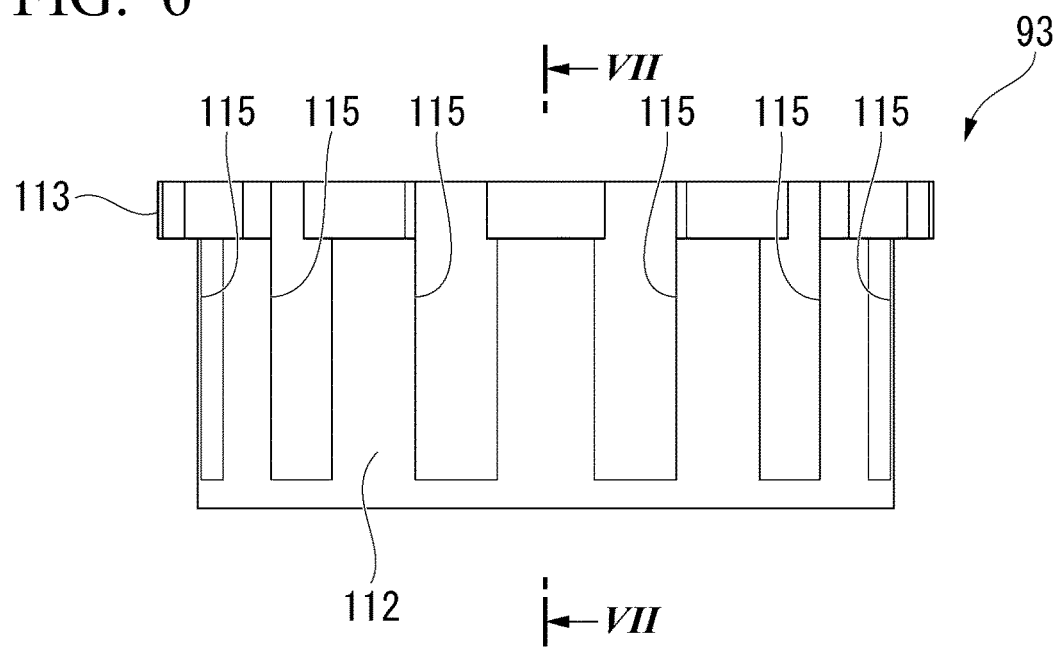
FIG. 6 is a front view illustrating a fourth piston of the cylinder device of the first embodiment according to the present invention.
Figure 7:
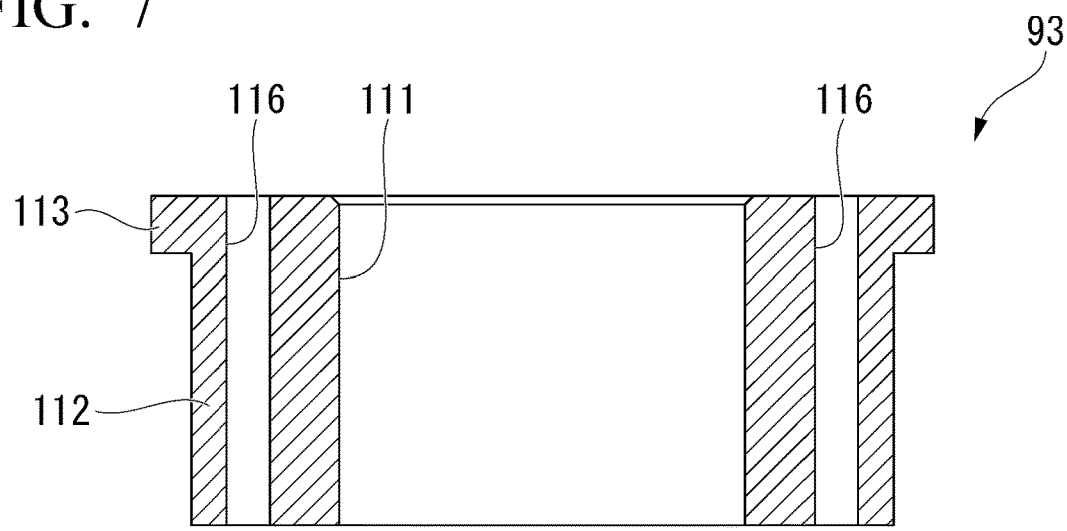
FIG. 7 is a cross-sectional view along line VII-VII in FIG. 6 illustrating the fourth piston of the cylinder device of the first embodiment according to the present invention.
Figure 8:
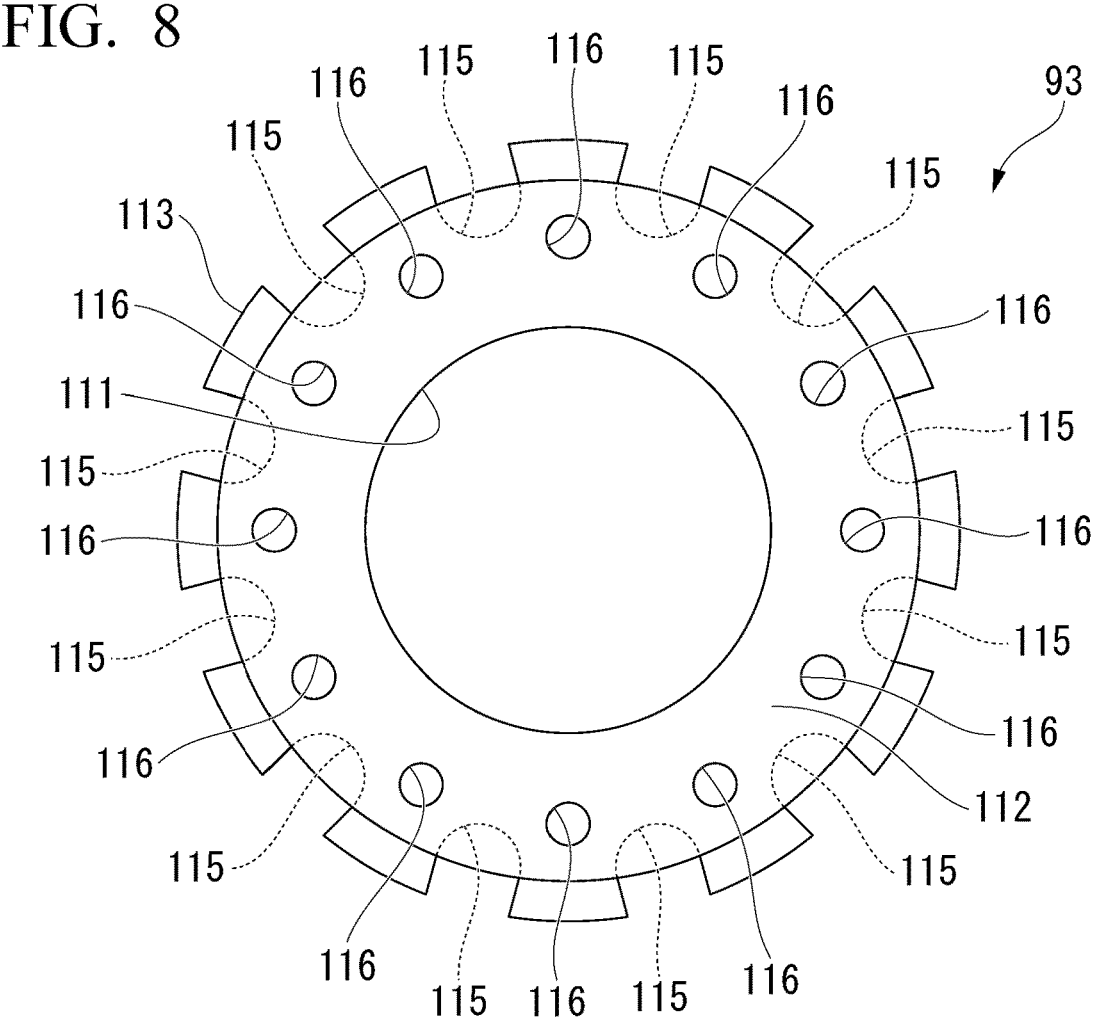
FIG. 8 is a bottom view illustrating the fourth piston of the cylinder device of the first embodiment according to the present invention.

The fourth piston 93 of the second piston main body 94 illustrated in FIG. 2 is integrally formed seamlessly and has the shape illustrated in FIGS. 6 to 8. As illustrated in FIGS. 7 and 8, the fourth piston 93 has a cylindrical shape in which a through hole 111 penetrating in the axial direction is formed at a center in the radial direction. The fourth piston 93 includes a cylindrical main body part 112 in which the through hole 111 penetrating in the axial direction is formed at the center in the radial direction, and a fourth piston flange part 113 (second restriction part) extending outward in the radial direction from one end portion of the main body part 112 in the axial direction.

As illustrated in FIG. 8, the fourth piston 93 includes an axial groove 115 having a substantially semicircular cross section formed to be recessed inward in the radial direction from an outer end on a radially outer side of the fourth piston flange part 113 to the inside of the outer circumferential portion of the main body part 112 by penetrating the fourth piston flange part 113 in the radial direction. As illustrated in FIG. 6, the axial groove 115 extends in an axial direction of the fourth piston 93 and is formed in the fourth piston flange part 113 and the main body part 112 to penetrate the fourth piston flange part 113 in the axial direction. The axial groove 115 extends from a predetermined intermediate position in the vicinity of an end portion on a side of the main body part 112 opposite to the fourth piston flange part 113 in the axial direction to an end portion on the fourth piston flange part 113 side, and opens outward from this end portion. As illustrated in FIG. 8, a plurality of axial grooves 115 of the same shape are formed in the fourth piston 93 at regular intervals in a circumferential direction of the fourth piston 93.

As illustrated in FIG. 7, a passage hole 116 penetrating the main body part 112 in the axial direction is formed in the main body part 112 on a radially outward side from the through hole 111. As illustrated in FIG. 8, a plurality of passage holes 116 of the same shape are formed in the main body part 112 at regular intervals in a circumferential direction of the main body part 112. The same number of the passage holes 116 as the number of the axial grooves 115 is provided in the fourth piston 93, and the passage holes 116 and the axial grooves 115 are disposed alternately at regular intervals in the circumferential direction of the fourth piston 93.

As illustrated in FIG. 2, in the second piston main body 94, the fourth piston 93 is fitted to the first fitting part 41 of the rod second outer diameter part 32 of the first mounting shaft part 26 of the piston rod 21 at the through hole 111. At that time, in the fourth piston 93, an end portion of the main body part 112 on the fourth piston flange part 113 side in the axial direction, that is, an upper end portion, is brought into contact with the first rod flange part 33.

The third piston 92 of the second piston main body 94 is fitted to the first fitting part 41 of the rod second outer diameter part 32 of the first mounting shaft part 26 of the piston rod 21 at the through hole 101. At that time, the third piston 92 is directed so that the inner seat part 103 and the valve seat part 104 face a side opposite to the fourth piston 93 in the axial direction, and come into contact with an end portion, that is, a lower end portion, of the fourth piston 93 on a side opposite to the fourth piston flange part 113 in the axial direction of the main body part 112 at an end portion on a side opposite to the inner seat part 103 and the valve seat part 104 in the axial direction. An end portion of the fourth piston 93 on the fourth piston flange part 113 side in the axial direction of the main body part 112, which is one end of the second piston 91 on the first end portion 3a side in the axial direction, comes into contact with the first rod flange part 33 between the rod first outer diameter part 31 of the piston rod 21 and the rod second outer diameter part 32 having a smaller diameter than the rod first outer diameter part 31. The passage hole 116 of the fourth piston 93 is disposed on a radially outward side from the rod first outer diameter part 31.

In the second piston main body 94 fitted to the piston rod 21 as described above, an outer diameter of the third piston 92 and an outer diameter of the fourth piston flange part 113 of the fourth piston 93 are the same. These outer diameters are smaller than an inner diameter of the cylindrical part 85 of the second cylinder 4. An outer diameter of the main body part 112 on the third piston 92 side with respect to the fourth piston flange part 113 in the axial direction of the fourth piston 93 is smaller than the outer diameter of the third piston 92 and the outer diameter of the fourth piston flange part 113 of the fourth piston 93. Therefore, the second piston 91 includes the third piston 92 and the fourth piston 93 whose outer diameter on the third piston 92 side is smaller than the outer diameter of the third piston 92.

In the second piston main body 94 fitted to the piston rod 21, the annular groove 106 of the third piston 92 and the passage hole 116 of the fourth piston 93 overlap in position in a radial direction of the second piston main body 94.

Therefore, in the second piston main body 94, a passage in the recessed groove 102, passages in the plurality of passage holes 107, and a passage in the annular groove 106 of the third piston 92, and passages in the plurality of passage holes 116 of the fourth piston 93 communicate with each other to form a communication passage 118 that penetrates the second piston main body 94 in the axial direction.

The piston ring main body 96 is made of, for example, a metal and has a cylindrical shape. The seal ring 97 is made of, for example, rubber and has an annular shape. The seal ring 97 is formed of an elastic material with high sealing properties.

The main body part 112 of the fourth piston 93 is inserted through the inside of the piston ring main body 96, and in this state, the piston ring main body 96 is disposed between the fourth piston flange part 113 of the fourth piston 93 and the third piston 92. The main body part 112 of the fourth piston 93 is inserted through the inside of the seal ring 97, and in this state, the seal ring 97 is disposed between the piston ring main body 96 and the third piston 92. In other words, the seal ring 97 is disposed on the third piston 92 side in an axial direction of the piston ring main body 96.

The piston ring 95 has a combined axial length of the piston ring main body 96 and the seal ring 97 smaller than an axial length between the fourth piston flange part 113 of the fourth piston 93 and the third piston 92, and is therefore slidable in the axial direction between the fourth piston flange part 113 and the third piston 92 with respect to the second piston main body 94. In other words, the piston ring 95 is provided around an outer circumference of the second piston 91 to be movable in the axial direction, the third piston 92 is provided on a side of the piston ring 95 opposite to the first end portion 3a in the axial direction to restrict movement of the piston ring 95 in the axial direction, and the fourth piston flange part 113 of the fourth piston 93 is provided on the first end portion 3a side of the piston ring 95 in the axial direction to restrict movement of the piston ring 95 in the axial direction. The seal ring 97 of the piston ring 95 can come into contact with the third piston 92 over the entire circumference, and when the seal ring 97 comes into contact with the third piston 92 in this way, a gap between itself and the third piston 92 is closed around the entire circumference.

The piston ring main body 96 has an outer diameter slightly smaller than the inner diameter of the cylindrical part 85 of the second cylinder 4 and is provided to be able to fit into the second cylinder 4. The seal ring 97 has an outer diameter slightly smaller than the inner diameter of the cylindrical part 85 of the second cylinder 4 and is provided to be able to fit into the second cylinder 4. Therefore, the second piston 91 including the piston ring 95 is provided to be movable according to movement of the piston rod 21 and able to fit into the second cylinder 4. In the piston ring 95, both the piston ring main body 96 and the seal ring 97 are slidable in the axial direction in the cylindrical part 85 of the second cylinder 4.

The second piston assembly 90 includes a valve body 120 provided on a side of the third piston 92 opposite to the fourth piston 93 in the axial direction, a small diameter disc 121 provided on a side of the valve body 120 opposite to the third piston 92 in the axial direction, and a large diameter disc 122 provided on a side of the small diameter disc 121 opposite to the valve body 120 in the axial direction.

The valve body 120 is configured by laminating a plurality of annular discs. The small diameter disc 121 has an outer diameter smaller than an outer diameter of the valve body 120. The large diameter disc 122 has an outer diameter the same as the outer diameter of the valve body 120.

The valve body 120, the small diameter disc 121, and the large diameter disc 122 are fitted to the first fitting part 41 of the rod second outer diameter part 32 of the first mounting shaft part 26 of the piston rod 21. The valve body 120 is in contact with the inner seat part 103 of the third piston 92 over the entire circumference, and can come into contact with the valve seat part 104 over the entire circumference. When the valve body 120 is seated on the valve seat part 104 of the third piston 92 over the entire circumference, the communication passage 118 of the second piston main body 94 is closed. When the valve body 120 is separated from the valve seat part 104 of the third piston 92, the communication passage 118 of the second piston main body 94 is opened. The valve body 120 has an outer diameter slightly smaller than an outer diameter of the second piston main body 94, and can enter the inside of the cylindrical part 85 of the second cylinder 4.

The second piston assembly 90 includes an annular member 123 provided on a side of the large diameter disc 122 opposite to the small diameter disc 121 in the axial direction. The annular member 123 has an annular shape and is fitted to the first fitting part 41 of the rod second outer diameter part 32 of the first mounting shaft part 26 of the piston rod 21. The annular member 123 has an outer diameter smaller than an outer diameter of the large diameter disc 122. The annular member 123 restricts deformation of the valve body 120 beyond a specified limit when the valve body 120 opens.

The stopper mechanism 81 includes a nut 124 (biasing part) that fixes the second piston assembly 90 to the piston rod 21. The nut 124 is provided on a side of the annular member 123 opposite to the large diameter disc 122 in the axial direction.

The nut 124 has an annular shape in which a through hole 131 penetrating in the axial direction is formed at a center in the radial direction. In the through hole 131, a female screw part 132 is formed on an inner circumferential portion on one side in the axial direction, and a fitting part 133 in which an inner circumferential surface has a cylindrical surface shape is formed on an inner circumferential portion on the other side in the axial direction.

The nut 124 is screwed onto the first male screw part 42 of the rod second outer diameter part 32 of the first mounting shaft part 26 of the piston rod 21 at the female screw part 132. At that time, the nut 124 is such that the fitting part 133 is in a state of being directed toward the annular member 123 side with respect to the female screw part 132 in the axial direction, and the fitting part 133 is fitted to the first fitting part 41 of the rod second outer diameter part 32 of the first mounting shaft part 26. The second piston 91 is configured such that an upper end of the fourth piston 93 on a side opposite to the third piston 92, which is one axial end of the second piston 91, is in contact with the first rod flange part 33 of the piston rod 21, and a lower end of the third piston 92 on a side opposite to the fourth piston 93, which is the other axial end of the second piston, is supported by the nut 124 via the valve body 120, the small diameter disc 121, the large diameter disc 122, and the annular member 123.

When the nut 124 is fastened onto the first male screw part 42 of the rod second outer diameter part 32 of the first mounting shaft part 26, the other end of the second piston 91 on a side opposite to the first end portion 3a in the axial direction is biased by diameter disc 122, the small diameter disc 121, and the valve body 120 so that one end thereof on the first end portion 3a side in the axial direction is brought into contact with the first rod flange part 33 of the piston rod 21. In other words, the other end of the second piston 91 on a side opposite to the first end portion 3a in the axial direction is biased by the first male screw part 42 and the nut 124 that bias the second piston 91 toward the first rod flange part 33. In yet other words, an end portion of the second piston 91 on a side opposite to the first end portion 3a in the axial direction is biased to the first rod flange part 33 side by the first male screw part 42 and the nut 124, and thereby an end portion thereof on the first end portion 3a side in the axial direction is pressed against the first rod flange part 33.

The second piston assembly 90 and the nut 124 move together with the piston rod 21.

Here, when the piston rod 21 is within a first predetermined range in which the piston ring 95 of the second piston 91 is disposed below the second cylinder 4 and the piston ring 95 is not fitted into the second cylinder 4, the inside of the second cylinder 4 becomes the first chamber 19 as a whole.

From this state, during the extension stroke, the piston rod 21 moves to a second predetermined range on the extension side with respect to the first predetermined range. Then, in the stopper mechanism 81, the piston ring 95 of the second piston 91 that moves together with the piston rod 21 enters the inside of the enlarged diameter part 86 of the second cylinder 4 and then fits into the cylindrical part 85 of the second cylinder 4. At the beginning of this fitting, the seal ring 97 of the piston ring 95 is pressed against the third piston 92 by a frictional force with the second cylinder 4 that comes into contact therewith and a flow of the oil fluid L flowing from the rod guide 51 side with respect to the piston ring 95 in the second cylinder 4 to a side opposite to the rod guide 51. As a result, the seal ring 97 of the piston ring 95 comes into contact with the third piston 92 in the axial direction to close a passage between itself and the third piston 92. Then, a flow of the oil fluid L flowing from the rod guide 51 side with respect to the piston ring 95 illustrated in FIG. 2 to a side opposite to the rod guide 51 through passages in the plurality of axial grooves 115, illustrated in FIG. 6, of the fourth piston 93 is restricted. The second piston 91 is positioned inside the second cylinder 4, and partitions the inside of the second cylinder 4 into one side chamber 141 on the rod guide 51 side with respect to the second piston 91 and the other side chamber 142 on a side opposite to the rod guide 51 with respect to the second piston 91 when the piston ring 95 is caused to enter the inside of the second cylinder 4. In other words, when the second piston 91 is positioned inside the second cylinder 4, the second piston 91 partitions the inside of the second cylinder 4 into the one side chamber 141 on the first end portion 3a side in the axial direction with respect to the second piston 91 and the other side chamber 142 on a side opposite to the first end portion 3a with respect to the second piston 91.

Here, during the extension stroke in the second predetermined range, in the second piston assembly 90 of the stopper mechanism 81, the second piston 91 moves to the rod guide 51 side with the piston ring 95 closing the passage between itself and the third piston 92 as described above. At a lower portion of the second predetermined range, the piston ring 95 is at a position of the plurality of grooves 87 provided in the second cylinder 4 and allows the oil fluid L to flow through the plurality of grooves 87. At that time, as the second piston 91 approaches the rod guide 51, among the plurality of grooves 87, the number of the grooves 87 in an open state decreases and eventually becomes zero. Thereby, the second cylinder 4 and the second piston 91 increase a damping force generated in stages.

When the second piston assembly 90 moves further to the extension side, the piston ring 95 slides on a portion above any of the plurality of grooves 87 in the second cylinder 4 to approach the rod guide 51 while the piston ring 95 remains in a state of closing the passage between itself and the third piston 92. Then, the second piston assembly 90 slides inside the second cylinder 4 to approach the rod guide 51 while a gap with the second cylinder 4 is closed by the piston ring 95.

When a pressure in the one side chamber 141 becomes higher than a pressure in the other side chamber 142 by a predetermined value or more while the second piston assembly 90 slides to the extension side in the second cylinder 4, the valve body 120 of the second piston assembly 90 opens to allow the oil fluid L of the one side chamber 141 to flow into the other side chamber 142 through the communication passage 118 while generating a damping force.

As described above, the second piston 91 includes the communication passage 118 provided to allow communication between the one side chamber 141 on the first end portion 3a side in the axial direction with respect to the second piston 91 in the second cylinder 4 and the other side chamber 142 on a side opposite to the first end portion 3a in the axial direction with respect to the second piston 91 in the second cylinder 4 when the second piston 91 is positioned inside the second cylinder 4. Then, the valve body 120 that opens when a pressure in the one side chamber 141 reaches a predetermined pressure higher than a pressure in the other side chamber 142 by a predetermined value or more to allow communication between the one side chamber 141 and the other side chamber 142 through the communication passage 118 is provided on the other side chamber 142 side of the second piston 91.

The second piston assembly 90 of the stopper mechanism 81 stops at an upper limit position of the second predetermined range by bringing the second piston 91 into contact with the rod guide 51 at an end portion of the fourth piston 93 on a side opposite to the third piston 92 in the axial direction.

During the compression stroke in the second predetermined range, the second piston assembly 90 of the stopper mechanism 81 moves in a direction in which the second piston main body 94 moves away from the rod guide 51 from a state in which the piston ring 95 of the second piston 91 is fitted in the second cylinder 4. Then, the piston ring 95, together with the seal ring 97 and the piston ring main body 96, moves away from the third piston 92 in the axial direction to open the passage between itself and the third piston 92 due to a frictional force with the second cylinder 4 and a flow of the oil fluid L flowing from the other side chamber 142 to the one side chamber 141, and allows the passage to communicate with the passages in the plurality of axial grooves 115, illustrated in FIG. 6, of the fourth piston 93. In the compression stroke thereafter, the second piston assembly 90 illustrated in FIG. 2 moves in a direction away from the rod guide 51 illustrated in FIG. 2 while maintaining a state in which the piston ring 95 opens the passage between itself and the third piston 92 and the passage is allowed to communicate with the passages in the plurality of axial grooves 115 illustrated in FIG. 6. Then, the second piston 91 allows the oil fluid L in the other side chamber 142 to flow into the one side chamber 141 via the passage between the piston ring 95 and the third piston 92 and the passages in the plurality of axial grooves 115. Thereby, a damping force on movement of the piston rod 21 in a compression direction reduces.

In the second piston 91, when the piston ring 95 is separated from the rod guide 51 by a predetermined distance during the compression stroke from a state in which the piston ring 95 is on the rod guide 51 side with respect to all the grooves 87 in the second cylinder 4, the grooves 87 provided in the second cylinder 4 open. Then, the oil fluid L flows through the grooves 87 in addition to the flow through the passage between the piston ring 95 and the third piston 92 and the passages in the plurality of axial grooves 115, thereby reducing the damping force on movement of the piston rod 21 in the compression direction. At that time, as the second piston 91 becomes further away from the rod guide 51, among the plurality of grooves 87, the number of the grooves 87 through which the oil fluid L flows increases. Thereby, the damping force on the movement of the piston rod 21 in the compression direction reduces in stages.

A body valve assembly (not illustrated) that partitions the second chamber 20 and the reservoir chamber 7 includes a damping force generation mechanism that restricts a flow of the oil fluid L from the reservoir chamber 7 to the second chamber 20 and generates a damping force while allowing the oil fluid L to flow from the second chamber 20 to the reservoir chamber 7, and a suction valve mechanism that restricts a flow of the oil fluid L from the second chamber 20 to the reservoir chamber 7 and allows the oil fluid L to flow from the reservoir chamber 7 to the second chamber 20 substantially without generating a damping force.

Next, main operations of the cylinder device 1 will be described.

"Extension stroke when piston rod 21 is within first predetermined range in which piston ring 95 of second piston 91 is not fitted into second cylinder 4"

{First speed region in which piston speed is lower than first predetermined value}

In this first speed region of the extension stroke, the oil fluid L from the first chamber 19 flows from the first passage 71 to the second chamber 20 through a fixed orifice (not illustrated) between the first damping valve 75 and the first piston 18 in the first piston assembly 17. Therefore, in the first speed region of the extension stroke, a damping force having orifice characteristics is generated.

{Second speed region in which piston speed is equal to or higher than first predetermined value}

In this second speed region of the extension stroke, the oil fluid L from the first chamber 19 flows from the first passage 71 into the second chamber 20 while opening the first damping valve 75 in the first piston assembly 17. Therefore, in the second speed region of the extension stroke, a damping force having valve characteristics due to the first damping valve 75 is generated.

"Compression stroke when piston rod 21 is within first predetermined range"

{Third speed region in which piston speed is lower than second predetermined value}

In this third speed region of the compression stroke, the oil fluid L from the second chamber 20 flows from the second passage 72 into the first chamber 19 through a fixed orifice (not illustrated) between the second damping valve 76 and the first piston 18 in the first piston assembly 17. Therefore, in the third speed region of the compression stroke, a damping force having orifice characteristics (in which a damping force is substantially proportional to the square of the piston speed) is generated.

{Fourth speed region in which piston speed is equal to or higher than second predetermined value}

In this fourth speed region of the compression stroke, the oil fluid L from the second chamber 20 flows from the second passage 72 into the first chamber 19 while opening the second damping valve 76 in the first piston assembly 17. Therefore, in the fourth speed region of the compression stroke, a damping force having valve characteristics (in which a damping force is substantially proportional to the piston speed) due to the second damping valve 76 is generated.

"Extension stroke in which piston rod 21 is within second predetermined range in which piston ring 95 of second piston 91 is fitted into second cylinder 4"

In this extension stroke, the first piston assembly 17 operates in the same manner as in the first predetermined range. In addition, the second piston 91 of the second piston assembly 90 moves in a direction toward the rod guide 51 in the axial direction of the first cylinder 3 to cause the piston ring 95 to be fitted into the second cylinder 4. Then, at the beginning thereof, the seal ring 97 of the piston ring 95 closes the passage between itself and the third piston 92.

With the piston ring 95 closing the passage between itself and the third piston 92 in this manner, the second piston 91 moves to the rod guide 51 side. Then, the oil fluid L flows from the one side chamber 141 into the other side chamber 142 in the second cylinder 4 after being squeezed by the plurality of grooves 87 provided in the second cylinder 4. At that time, a damping force generated by the second cylinder 4 and the second piston 91 increases. Moreover, as the second piston 91 approaches the rod guide 51, among the plurality of grooves 87, the number of the grooves 87 through which the oil fluid L flows decreases and eventually becomes zero. Thereby, the damping force generated increases in stages, and the damping force on the movement of the piston rod 21 in an extension direction increases in stages.

When a pressure in the one side chamber 141 becomes higher than a pressure in the other side chamber 142 by a predetermined value or more while the second piston assembly 90 slides to the extension side in the second cylinder 4, the valve body 120 of the second piston assembly 90 opens to allow the oil fluid L of the one side chamber 141 to flow into the other side chamber 142 through the communication passage 118 while generating a damping force.

An amount of the damping force generated by the stopper mechanism 81 increases with respect to the damping force generated by the first piston assembly 17.

"Compression stroke in which piston rod 21 is within second predetermined range"

In this compression stroke, the first piston assembly 17 operates in the same manner as in the first predetermined range. In addition, the second piston 91 moves in a direction away from the rod guide 51. Then, at the beginning thereof, the seal ring 97 of the piston ring 95 opens the passage between itself and the third piston 92.

With the piston ring 95 opening the passage between itself and the third piston 92 as described above, the second piston 91 moves in a direction away from the rod guide 51. Then, the oil fluid L flows from the other side chamber 142 to the one side chamber 141 via the passage between the piston ring 95 and the third piston 92 and the passages in the plurality of axial grooves 115 of the fourth piston 93.

When the piston ring 95 passes the position of the grooves 87 provided in the second cylinder 4 from a state in which it is on the rod guide 51 side with respect to all the grooves 87 provided in the second cylinder 4, the oil fluid L flows from the other side chamber 142 to the one side chamber 141 through the grooves 87 in addition to the flow through the passage between the piston ring 95 and the third piston 92 and the passages in the plurality of axial grooves 115 of the fourth piston 93. At that time, as the second piston 91 becomes further away from the rod guide 51, among the plurality of grooves 87, the number of the grooves 87 through which the oil fluid L flows increases. Thereby, the damping force on the movement of the piston rod 21 in the compression direction reduces in stages.

Japanese Unexamined Patent Application, First Publication No. 2015-161404 described above discloses a cylinder device including a second cylinder and a second piston in which a damping force increases when a piston rod reaches a predetermined range on a limit side during an extension stroke in which the piston rod extends from the cylinder. In this cylinder device, since the second piston is directly fixed to the piston rod by plastically deforming the second piston, there is a concern that durability may deteriorate when it receives a high pressure. Also, United States Patent Application, Publication No. 2015/0330475 discloses a cylinder device including a second cylinder and a second piston in which a damping force increases when a piston rod reaches a predetermined range on a limit side during a compression stroke in which the piston rod is pushed into the cylinder. In this cylinder device, although the second piston is in contact with a flange part of the piston rod, since increasing a pressure receiving area of the flange part will reduce a rigidity of the piston rod, the pressure receiving area cannot be increased, and therefore there is a concern that durability may deteriorate when the flange part receives a high pressure.

The cylinder device 1 of the first embodiment includes the first cylinder 3 in which a working fluid is sealed, the first piston 18 fitted in the first cylinder 3 to be slidable and partitioning the inside of the first cylinder 3, the piston rod 21 connected to the first piston 18, and the stopper mechanism 81 that operates when the piston rod 21 reaches a predetermined position on the first end portion 3a side of one axial end of the first cylinder 3 during the extension stroke. The stopper mechanism 81 includes the second cylinder 4 provided on the first end portion 3a side of the first cylinder 3 and having a smaller diameter than the first cylinder 3, and the second piston 91 provided to be movable according to movement of the piston rod 21 and able to fit into the second cylinder 4. Then, one end of the second piston 91 on the first end portion 3a side comes into contact with the first rod flange part 33 between the rod first outer diameter part 31 of the piston rod 21 and the rod second outer diameter part 32 having a smaller diameter than the rod first outer diameter part 31. Also, the other end of the second piston 91 on a side opposite to the first end portion 3a is biased by a nut 124 that biases the second piston 91 toward the rod flange part 33. Thereby, since the cylinder device 1 has a structure in which the nut 124 biases the other end of the second piston 91 on a side opposite to the first end portion 3a, which receives a high pressure from the first end portion 3a side when the stopper mechanism 81 operates, in a direction of the first rod flange part 33, that is, in a direction that resists the high pressure, durability can be enhanced.

In the cylinder device 1, since the rod first outer diameter part 31 and the rod second outer diameter part 32 are integrally formed, it is easy to achieve coaxiality.

In the cylinder device 1, the second piston 91 includes the communication passage 118 provided to allow communication between the one side chamber 141 on the first end portion 3a side with respect to the second piston 91 in the second cylinder 4 and the other side chamber 142 on a side opposite to the first end portion 3a with respect to the second piston 91 in the second cylinder 4 when the second piston 91 is positioned in the second cylinder 4. Also, in the cylinder device 1, the valve body 120 that opens when a pressure in the one side chamber 141 reaches a predetermined pressure to allow communication between the one side chamber 141 and the other side chamber 142 through the communication passage 118 is provided on the other side chamber 142 side of the second piston 91. Therefore, in the cylinder device 1, since the valve body 120 opens when the pressure in the one side chamber 141 reaches the predetermined pressure to allow the oil fluid L to flow from the one side chamber 141 to the other side chamber 142 through the communication passage 118, the durability can be further enhanced.

In the cylinder device 1, since the second piston 91 is biased toward the rod flange part 33 by the first male screw part 42 formed on the rod second outer diameter part 32 and the nut 124 screwed onto the first male screw part 42, the durability can be enhanced with a simple structure.

In the cylinder device 1, the second piston 91 includes the piston ring 95 provided around an outer circumference of the second piston 91 to be movable in the axial direction, and the third piston 92 on a side opposite to the first end portion 3a and the fourth piston flange part 113 of the fourth piston 93 on the first end portion 3a side that restrict a movement range of the piston ring 95 in the axial direction. Thereby, the movement range of the piston ring 95 in the axial direction can be restricted.

In the cylinder device 1, the second piston 91 includes the third piston 92 and the fourth piston 93 whose outer diameter on the third piston 92 side is smaller than the outer diameter of the third piston 92, and the movement range of the piston ring 95 in the axial direction is restricted by the third piston 92 on a side opposite to the first end portion 3a and the fourth piston flange part 113 formed on a side of the fourth piston 93 opposite to the third piston 92. Therefore, the movement range of the piston ring 95 in the axial direction can be restricted with a simple structure.

In the cylinder device 1, since the outer diameter portion of the second rod flange part 47 that receives the biasing force by the nut 79 of the piston rod 21 is the extension part 44 whose outer circumferential surface has a cylindrical surface shape, damage to the screw part due to a force applied from the first piston assembly 17 can be prevented, and durability can be further enhanced.

Second Embodiment

Next, a cylinder device of a second embodiment will be described mainly on the basis of FIGS. 9 to 15, focusing on differences from the first embodiment. Further, parts common to those in the first embodiment will be denoted by the same terms and the same reference signs.

Figure 9:
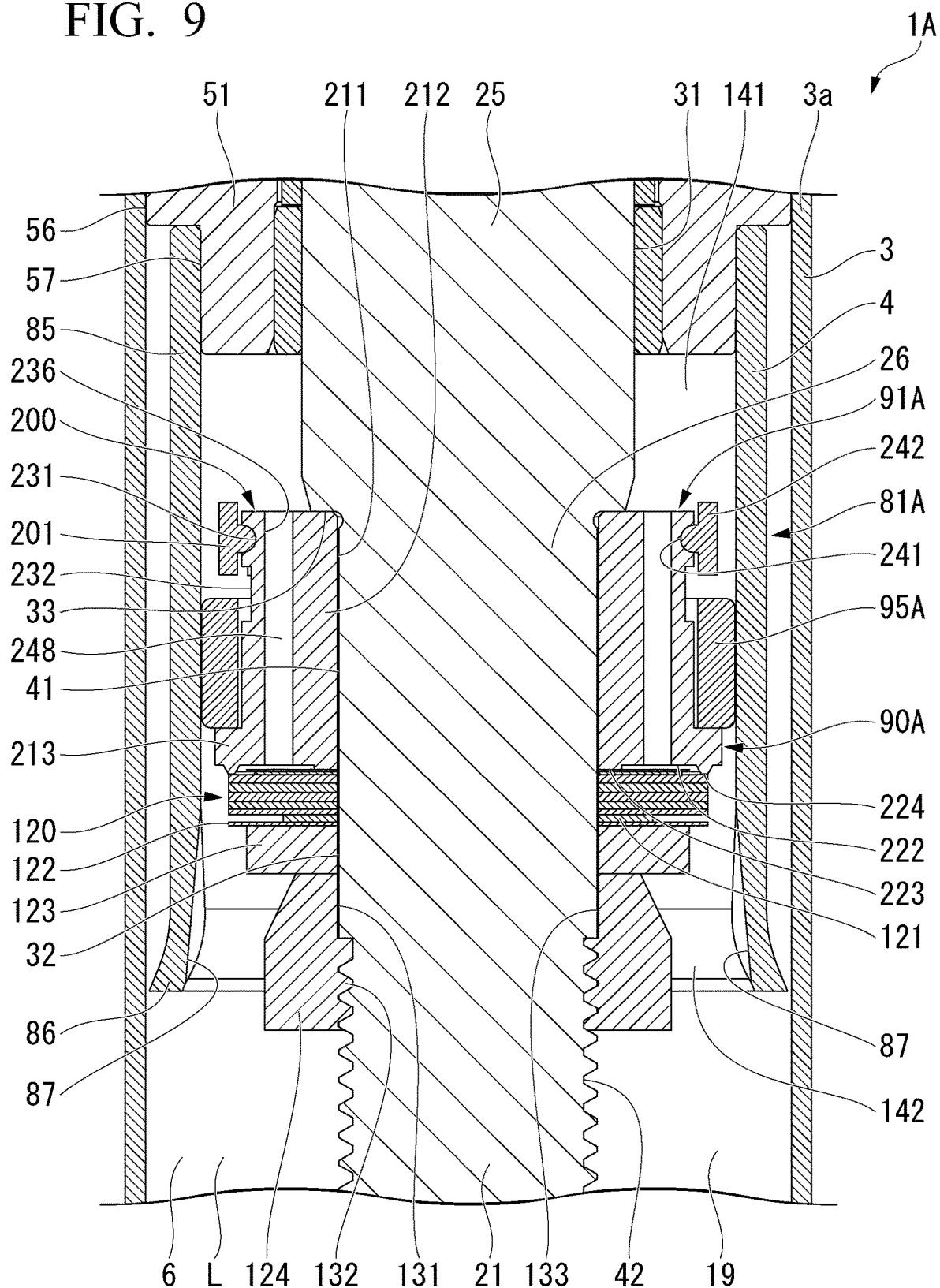
FIG. 9 is a cross-sectional view illustrating a stopper mechanism of a cylinder device of a second embodiment according to the present invention.

As illustrated in FIG. 9, a cylinder device 1A includes a stopper mechanism 81A, which is partially different from the stopper mechanism 81, instead of the stopper mechanism 81. The stopper mechanism 81A includes a second piston assembly 90A, which is partially different from the second piston assembly 90, instead of the second piston assembly 90. The second piston assembly 90A includes a second piston 91A, which is partially different from the second piston 91, instead of the second piston 91.

The second piston 91A includes a second piston main body 200, a ring member 201, and a piston ring 95A.

Figure 10:
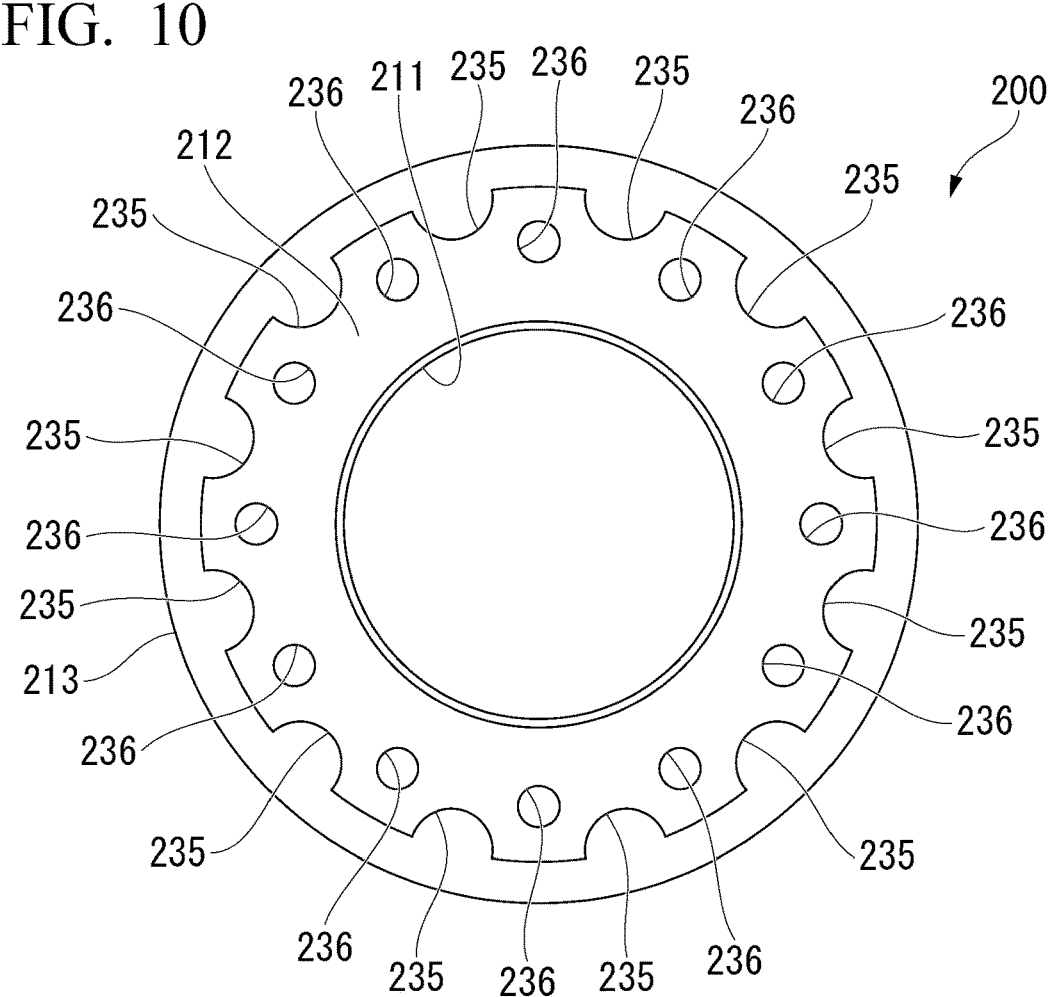
FIG. 10 is a plan view illustrating a second piston main body of the cylinder device of the second embodiment according to the present invention.
Figure 11:
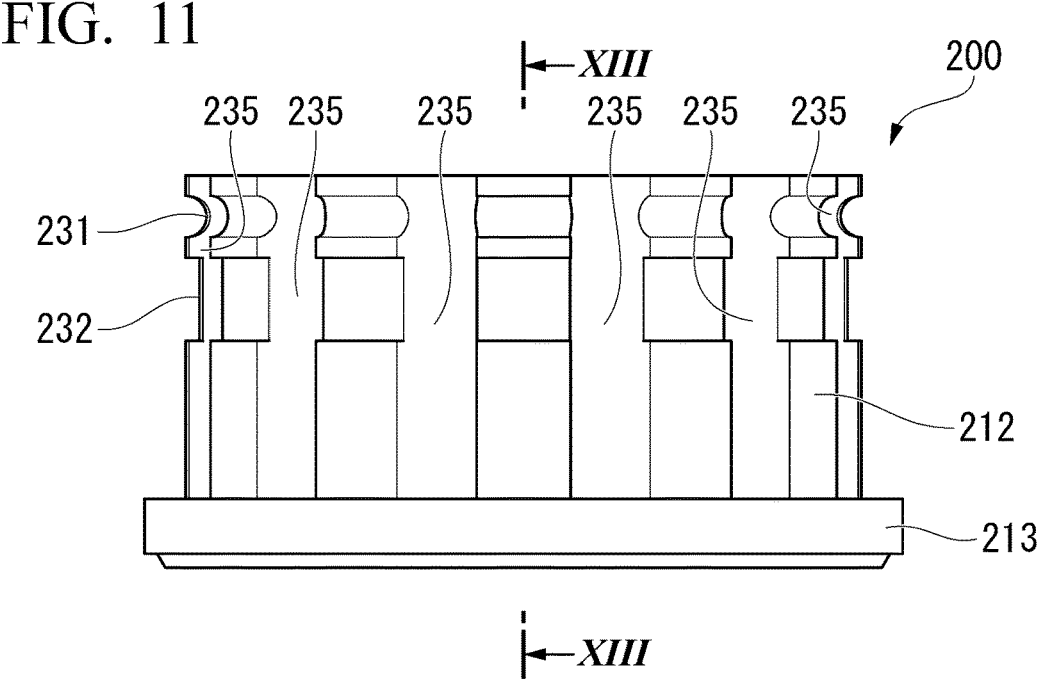
FIG. 11 is a front view illustrating the second piston main body of the cylinder device of the second embodiment according to the present invention.
Figure 12:
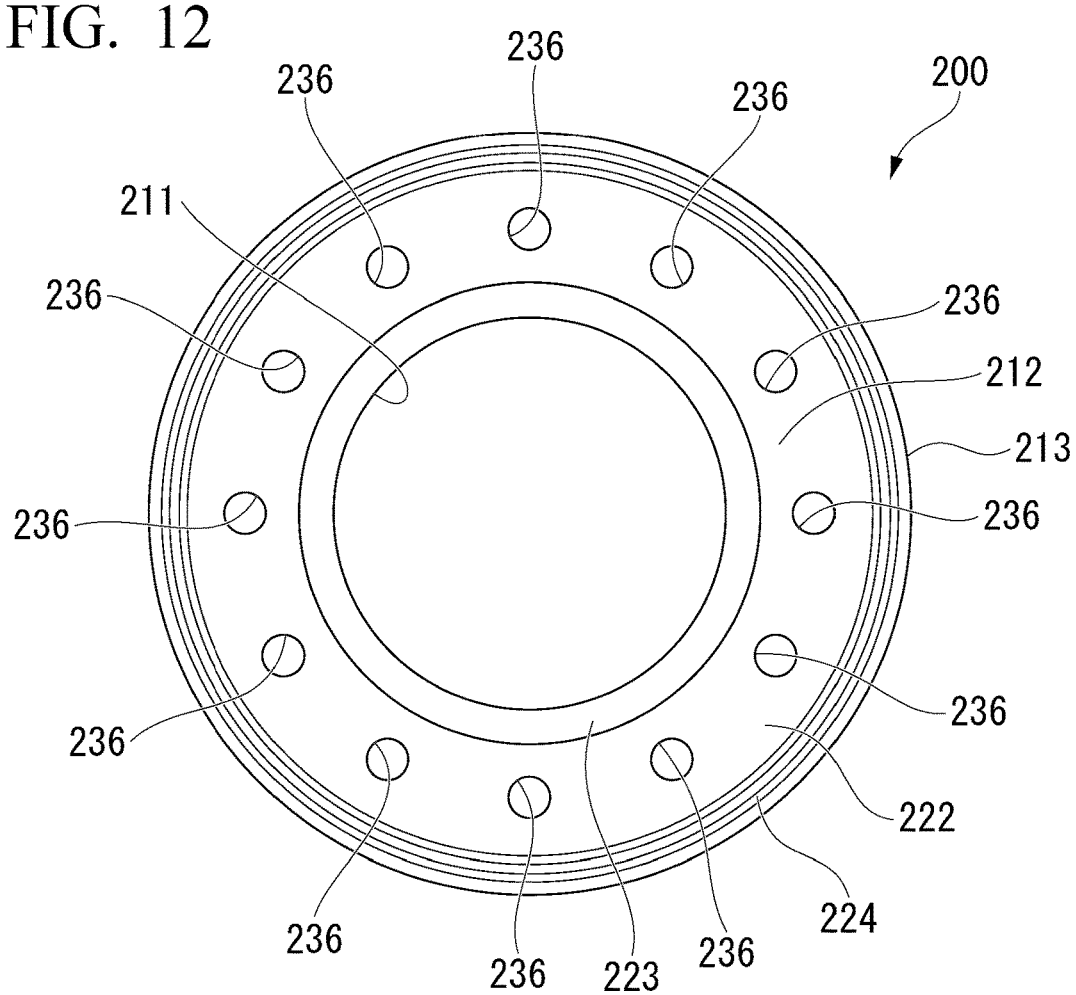
FIG. 12 is a bottom view illustrating the second piston main body of the cylinder device of the second embodiment according to the present invention.
Figure 13:
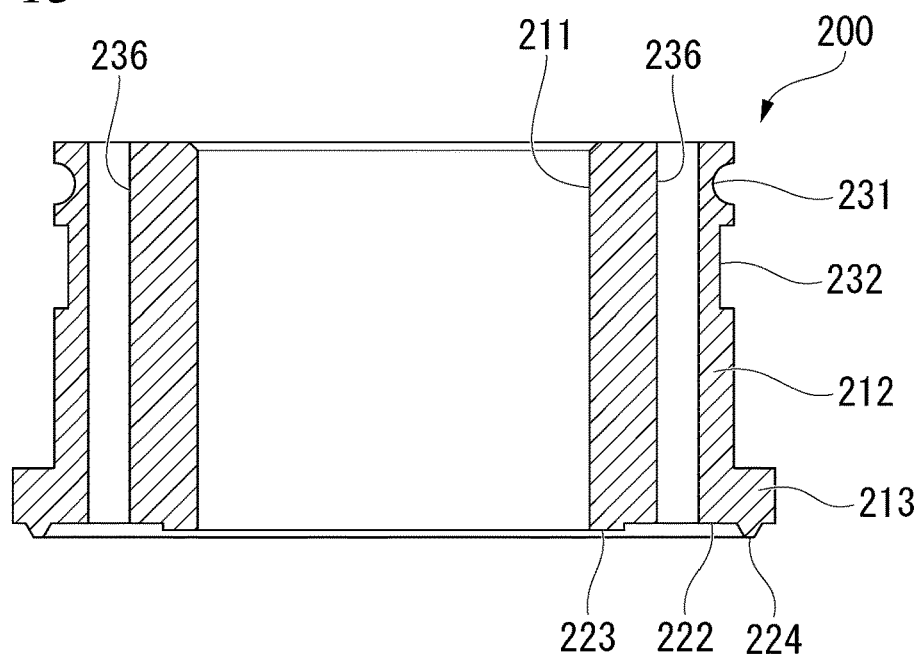
FIG. 13 is a cross-sectional view along line XIII-XIII in FIG. 11 illustrating the second piston main body of the cylinder device of the second embodiment according to the present invention.

The second piston main body 200 of the second piston 91A is integrally formed seamlessly and has the shape illustrated in FIGS. 10 to 13. As illustrated in FIGS. 10, 12, and 13, the second piston main body 200 has a cylindrical shape in which a through hole 211 penetrating in an axial direction is formed at a center in a radial direction. The second piston main body 200 includes a cylindrical main body part 212 illustrated in FIGS. 10 and 13 in which the through hole 211 penetrating in the axial direction is formed at the center in the radial direction, and a second piston flange part 213 (first restriction part) extending outward in the radial direction from one end portion of the main body part 212 in the axial direction as illustrated in FIGS. 11 and 13.

As illustrated in FIG. 13, a recessed groove 222 having an annular shape coaxial with the through hole 211 and recessed inward in the axial direction is formed in the second piston main body 200 on a radially outward side from the through hole 211 at one end portion on the second piston flange part 213 side in the axial direction. In the second piston main body 200, an inward side of the recessed groove 222 in the radial direction at an end portion on the second piston flange part 213 side in the axial direction is an inner seat part 223 that protrudes outward in the axial direction with respect to a bottom surface of the recessed groove 222. The inner seat part 223 is provided to surround the through hole 211 from the outside in the radial direction. In the second piston main body 200, an outward side of the recessed groove 222 in the radial direction at the end portion on the second piston flange part 213 side in the axial direction is a valve seat part 224 that protrudes outward in the axial direction with respect to the bottom surface of the recessed groove 222. The valve seat part 224 has a protrusion height from the bottom surface of the recessed groove 222 higher than that of the inner seat part 223.

In the second piston main body 200, a fitting groove 231 (groove) having a semicircular cross section recessed inward in the radial direction is formed coaxially with the through hole 211 on an outer circumferential portion in the vicinity of an end portion of the main body part 212 on a side opposite to the second piston flange part 213 in the axial direction. Also, in the second piston main body 200, a passage groove 232 having a rectangular cross section recessed inward in the radial direction is formed coaxially with the through hole 211 on an outer circumferential portion of the main body part 212 on the second piston flange part 213 side with respect to the fitting groove 231 in the axial direction.

As illustrated in FIG. 11, the second piston main body 200 includes an axial groove 235 recessed inward in a radial direction of the main body part 212 formed over the entire range that does not overlap the second piston flange part 213 in position in the axial direction of the main body part 212. The axial groove 235 extends in the axial direction of the second piston main body 200 and is formed in the main body part 212 to penetrate the fitting groove 231 and the passage groove 232 in the axial direction. The axial groove 235 opens outward from an end portion of the main body part 212 on a side opposite to the second piston flange part 213 in the axial direction. As illustrated in FIG. 10, the axial groove 235 has a semicircular cross section, and a plurality of axial grooves 235 of the same shape are formed in the second piston main body 200 at regular intervals in a circumferential direction of the second piston main body 200.

A passage hole 236 penetrating the second piston main body 200 in the axial direction as illustrated in FIG. 13 is formed in the second piston main body 200 on a radially outward side from the through hole 211 of the main body part 212. A plurality of passage holes 236 of the same shape are formed in the second piston main body 200 at regular intervals in the circumferential direction of the second piston main body 200 as illustrated in FIGS. 10 and 12. As illustrated in FIG. 10, the second piston main body 200 has the same number of the passage holes 236 as the number of the axial grooves 235, and the passage holes 236 and the axial grooves 235 are disposed alternately at regular intervals in the circumferential direction of the second piston main body 200. As illustrated in FIG. 13, end portions of the passage holes 236 on the second piston flange part 213 side in the axial direction open at the bottom surface of the recessed groove 222.

Figure 14:
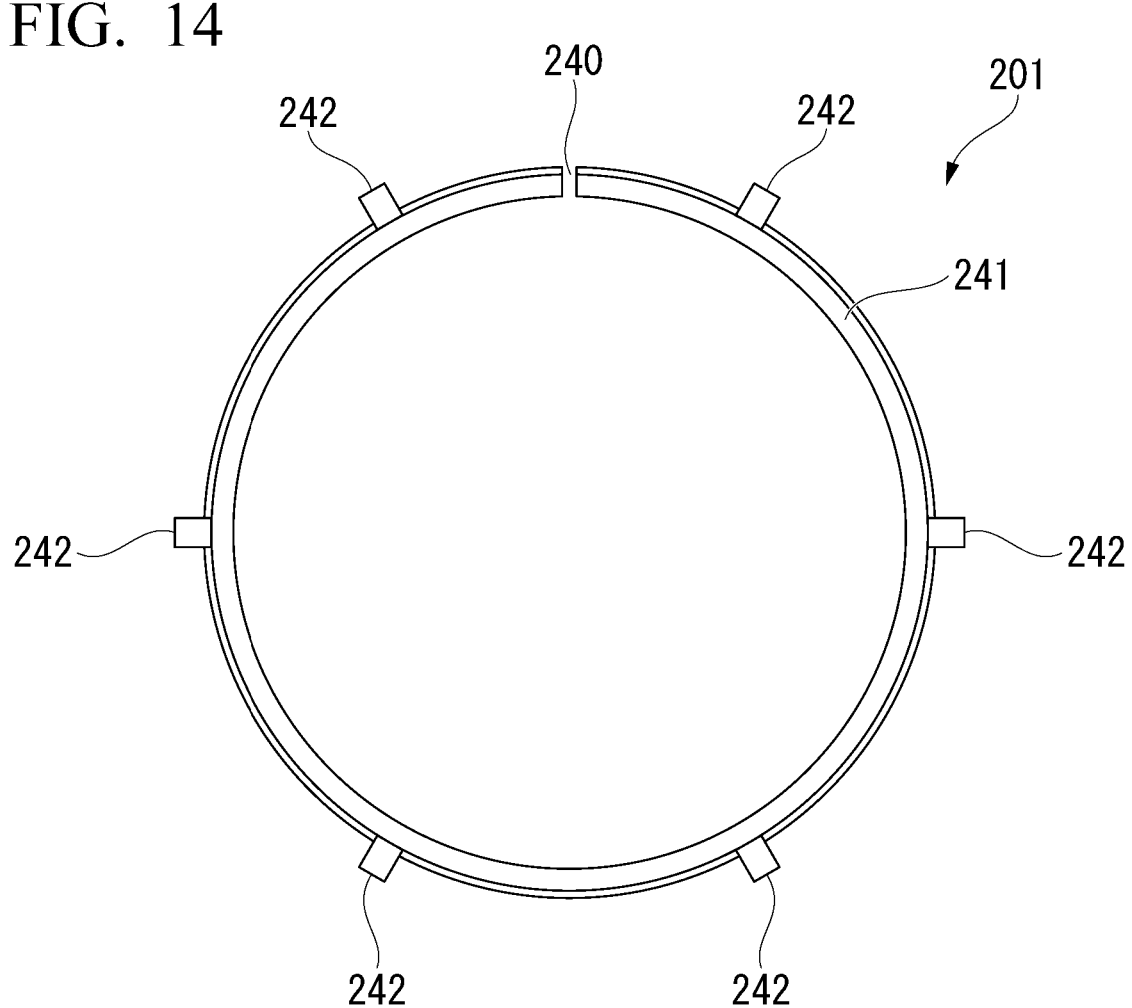
FIG. 14 is a plan view illustrating a ring member of the cylinder device of the second embodiment according to the present invention.
Figure 15:
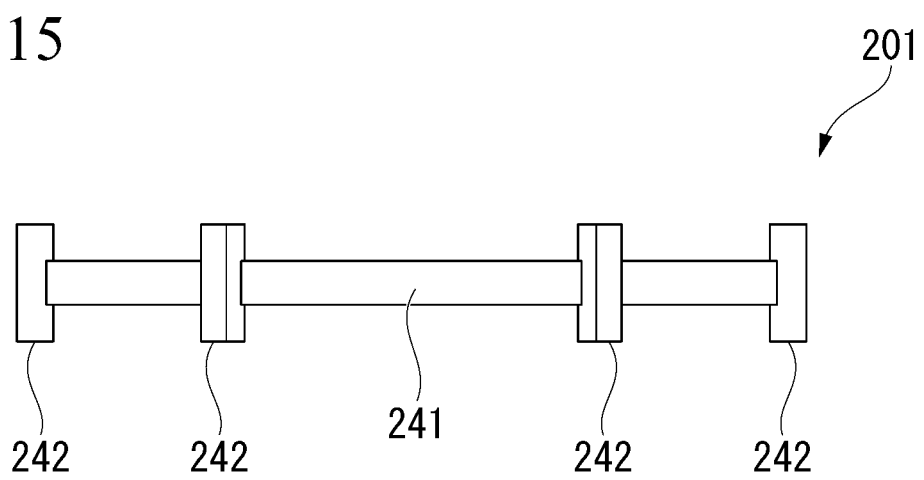
FIG. 15 is a front view illustrating the ring member of the cylinder device of the second embodiment according to the present invention.

The ring member 201 of the second piston 91A illustrated in FIG. 9 has the shape illustrated in FIGS. 14 and 15. The ring member 201 includes a C-shaped attachment part 241 that is broken at one place on the entire circumference to form a broken part 240, and a restriction part 242 provided on an outer circumferential portion of the attachment part 241. As illustrated in FIG. 9, the attachment part 241 has a semicircular cross section in which a width of the attachment part 241 in the axial direction becomes smaller toward the inside in the radial direction of the attachment part 241. As illustrated in FIGS. 14 and 15, the restriction part 242 has a square columnar shape and protrudes to both sides in the axial direction as illustrated in FIG. 15 while protruding outward in the radial direction from the outer circumferential portion of the attachment part 241. A plurality of restriction parts 242 of the same shape are provided on the ring member 201 at substantially regular intervals in the circumferential direction of the attachment part 241 as illustrated in FIG. 14.

As illustrated in FIG. 9, the second piston main body 200 is fitted to a first fitting part 41 of a rod second outer diameter part 32 of a first mounting shaft part 26 of a piston rod 21 at the through hole 211. At that time, in the second piston main body 200, an end portion of the main body part 212 on a side opposite to the second piston flange part 213 in the axial direction is brought into contact with a first rod flange part 33. Then, in the second piston main body 200, the second piston flange part 213 is formed on a side opposite to a first end portion 3a in the axial direction and the fitting groove 231 is formed on the first end portion 3a side. An end portion of the main body part 212 on a side opposite to the second piston flange part 213 in the axial direction, which is one end of the second piston main body 200 on the first end portion 3a side in the axial direction, comes into contact with the first rod flange part 33 between a rod first outer diameter part 31 of the piston rod 21 and the rod second outer diameter part 32 having a smaller diameter than the rod first outer diameter part 31. An outer diameter of the second piston flange part 213 of the second piston main body 200 fitted to the piston rod 21 in this way has a diameter smaller than an inner diameter of a cylindrical part 85 of a second cylinder 4. Also, the passage hole 236 of the second piston main body 200 is disposed on a radially outward side from the rod first outer diameter part 31.

The ring member 201 is fitted into the fitting groove 231 of the second piston main body 200 at the attachment part 241. An outer diameter of the ring member 201 attached to the second piston main body 200 is smaller than an inner diameter of the cylindrical part 85 of the second cylinder 4. In the ring member 201 attached to the second piston main body 200, lower end portions of the plurality of restriction parts 242 overlap an upper end portion of the passage groove 232 in position in the axial direction of the second piston main body 200.

In the second piston main body 200, a passage in the recessed groove 222 and passages in the plurality of passage holes 236 constitute a communication passage 248 penetrating the second piston main body 200 in the axial direction.

The piston ring 95A is made of, for example, a metal and has a cylindrical shape. The main body part 212 of the second piston main body 200 is inserted through the inside of the piston ring 95A, and in this state, the piston ring 95A is disposed between the second piston flange part 213 of the second piston main body 200 and the ring member 201.

The piston ring 95A has an axial length smaller than an axial length between the second piston flange part 213 of the second piston main body 200 and the restriction part 242 of the ring member 201, and is therefore movable in the axial direction with respect to the second piston main body 200 and the ring member 201 between the second piston flange part 213 and the restriction part 242 of the ring member 201. In other words, the piston ring 95A is provided around an outer circumference of the second piston main body 200 to be movable in the axial direction, the second piston flange part 213 of the second piston main body 200 is provided on a side of the second piston main body 200 opposite to the first end portion 3a in the axial direction to restrict movement of the piston ring 95A in the axial direction, and the restriction part 242 of the ring member 201 is provided on the first end portion 3a side of the second piston main body 200 in the axial direction to restrict movement of the piston ring 95A in the axial direction. The piston ring 95A can come into contact with the second piston flange part 213 of the second piston main body 200 over the entire circumference, and when the piston ring 95A comes into contact with the second piston flange part 213 in this way, a gap between itself and the second piston flange part 213 is closed around the entire circumference.

The piston ring 95A has an outer diameter slightly smaller than the inner diameter of the cylindrical part 85 of the second cylinder 4, and is provided to be able to fit into the second cylinder 4. Therefore, the second piston 91A including the piston ring 95A is provided to be movable according to movement of the piston rod 21 and able to fit into the second cylinder 4. The piston ring 95A is slidable in the axial direction in the cylindrical part 85 of the second cylinder 4.

In the second piston assembly 90A, a valve body 120 is in contact with the inner seat part 223 of the second piston main body 200 of the second piston 91A over the entire circumference. The valve body 120 can come into contact with the valve seat part 224 of the second piston main body 200 over the entire circumference. When the valve body 120 is seated on the valve seat part 224 of the second piston 91A over the entire circumference, the communication passage 248 of the second piston 91A is closed. When the valve body 120 is separated from the valve seat part 224 of the second piston 91A, the communication passage 248 of the second piston 91A is opened. The valve body 120 has an outer diameter slightly smaller than outer diameters of the second piston flange part 213 of the second piston 91A and the ring member 201, and can enter the inside of the cylindrical part 85 of the second cylinder 4.

Also in the stopper mechanism 81A, a nut 124 is screwed onto a first male screw part 42 of the rod second outer diameter part 32 of the first mounting shaft part 26 of the piston rod 21. The second piston 91A is configured such that an upper end of the main body part 212 of the second piston main body 200 on a side opposite to the second piston flange part 213, which is one axial end, is in contact with the first rod flange part 33 of the piston rod 21, and a lower end of the second piston main body 200 on the first rod flange part 33 side, which is the other axial end, is supported by the nut 124 via the valve body 120, a small diameter disc 121, a large diameter disc 122, and an annular member 123.

When the nut 124 is fastened onto the first male screw part 42 of the rod second outer diameter part 32 of the first mounting shaft part 26, the other end of the second piston 91A on a side opposite to the first end portion 3a in the axial direction is biased by diameter disc 122, the small diameter disc 121, and the valve body 120 so that one end thereof on the first end portion 3a side in the axial direction is brought into contact with the first rod flange part 33 of the piston rod 21. In other words, the other end of the second piston 91A on a side opposite to the first end portion 3a in the axial direction is biased by the first male screw part 42 and the nut 124 that bias the second piston 91A toward the first rod flange part 33. In yet other words, an end portion of the second piston 91A on a side opposite to the first end portion 3a in the axial direction is biased to the first rod flange part 33 side by the first male screw part 42 and the nut 124, and thereby an end portion thereof on the first end portion 3a side in the axial direction is pressed against the first rod flange part 33.

The second piston assembly 90A and the nut 124 move together with the piston rod 21.

Here, during an extension stroke, the piston rod 21 moves to a second predetermined range that is on an extension side with respect to a first predetermined range from a state in which the piston rod 21 is within the first predetermined range in which the piston ring 95A of the second piston 91A is disposed below the second cylinder 4 and the piston ring 95A is not fitted into the second cylinder 4. Then, in the stopper mechanism 81A, the piston ring 95A of the second piston assembly 90A that moves together with the piston rod 21 enters the inside of an enlarged diameter part 86 of the second cylinder 4 and then fits into the cylindrical part 85 of the second cylinder 4. At the beginning of this fitting, the piston ring 95A is pressed against the second piston flange part 213 of the second piston main body 200 by a frictional force with the second cylinder 4 that comes into contact therewith and a flow of an oil fluid L flowing from the rod guide 51 side with respect to the piston ring 95A in the second cylinder 4 to a side opposite to the rod guide 51. As a result, the piston ring 95A comes into contact with the second piston flange part 213 in the axial direction to close a passage between itself and the second piston flange part 213. Then, a flow of the oil fluid L flowing from the rod guide 51 side with respect to the piston ring 95A in the second cylinder 4 to a side opposite to the rod guide 51 through a passage in the passage groove 232 of the second piston main body 200 and passages in the plurality of axial grooves 235 illustrated in FIG. 11 is restricted. The second piston 91A is positioned inside the second cylinder 4, and partitions the inside of the second cylinder 4 into one side chamber 141 on the rod guide 51 side with respect to the second piston 91A and the other side chamber 142 on a side opposite to the rod guide 51 with respect to the second piston 91A when the piston ring 95A is caused to enter the inside of the second cylinder 4. In other words, when the second piston 91A is positioned inside the second cylinder 4, the second piston 91A partitions the inside of the second cylinder 4 into the one side chamber 141 on the first end portion 3a side in the axial direction with respect to the second piston 91A and the other side chamber 142 on a side opposite to the first end portion 3a with respect to the second piston 91A.

Here, during the extension stroke in the second predetermined range, the second piston 91A of the stopper mechanism 81A, together with the piston rod 21, moves to the rod guide 51 side with the piston ring 95A closing the passage between itself and the second piston flange part 213 of the second piston main body 200 as described above. At a lower portion of the second predetermined range, the piston ring 95A is at a position of the plurality of grooves 87 provided in the second cylinder 4 and allows the oil fluid L to flow through the plurality of grooves 87. At that time, as the second piston 91A approaches the rod guide 51, among the plurality of grooves 87, the number of the grooves 87 in an open state decreases and eventually becomes zero. Thereby, the second cylinder 4 and the second piston 91A increase a damping force generated in stages.

When the second piston assembly 90A moves further to the extension side, the piston ring 95A slides on a portion above any of the plurality of grooves 87 in the second cylinder 4 to approach the rod guide 51 while the piston ring 95A remains in a state of closing the passage between itself and the second piston flange part 213 of the second piston main body 200. Then, the second piston assembly 90A slides inside the second cylinder 4 to approach the rod guide 51 while a gap with the second cylinder 4 is closed by the piston ring 95A.

When a pressure in the one side chamber 141 becomes higher than a pressure in the other side chamber 142 by a predetermined value or more while the second piston assembly 90A slides to the extension side in the second cylinder 4, the valve body 120 of the second piston assembly 90A opens to allow the oil fluid L of the one side chamber 141 to flow into the other side chamber 142 through the communication passage 248 while generating a damping force.

As described above, the second piston 91A includes the communication passage 248 provided to allow communication between the one side chamber 141 on the first end portion 3a side in the axial direction with respect to the second piston 91A in the second cylinder 4 and the other side chamber 142 on a side opposite to the first end portion 3a in the axial direction with respect to the second piston 91A in the second cylinder 4 when the second piston 91A is positioned inside the second cylinder 4. Then, the valve body 120 that opens when a pressure in the one side chamber 141 reaches a predetermined pressure higher than a pressure in the other side chamber 142 by a predetermined value or more to allow communication between the one side chamber 141 and the other side chamber 142 through the communication passage 248 is provided on the other side chamber 142 side of the second piston 91A.

The second piston assembly 90A of the stopper mechanism 81A stops at an upper limit position of the second predetermined range by bringing the ring member 201 into contact with the rod guide 51 at end portions of the plurality of restriction parts 242 on a side opposite to the second piston flange part 213 in the axial direction, and then bringing the second piston main body 200 into contact with the rod guide 51 at an end portion thereof on a side opposite to the second piston flange part 213 in the axial direction.

During a compression stroke in the second predetermined range, the second piston 91A of the stopper mechanism 81A moves in a direction in which the second piston 91A, together with the piston rod 21, moves away from the rod guide 51 from a state in which the piston ring 95A of the second piston 91A is fitted in the second cylinder 4. Then, the piston ring 95A of the second piston 91A moves away from the second piston flange part 213 of the second piston main body 200 in the axial direction to open a passage between itself and the second piston flange part 213 due to a frictional force with the second cylinder 4 and a flow of the oil fluid L flowing from the other side chamber 142 to the one side chamber 141, and allows the passage to communicate with the passages in the plurality of axial grooves 235, illustrated in FIG. 11, of the second piston main body 200 and the passage in the passage groove 232. In the compression stroke thereafter, the second piston 91A moves in a direction away from the rod guide 51 while maintaining a state in which the piston ring 95A opens the passage between itself and the second piston flange part 213 and the passage is allowed to communicate with the passages in the plurality of axial grooves 235 of the second piston main body 200 and the passage in the passage groove 232. When the second piston 91A moves in a direction away from the rod guide 51, the second piston 91A allows the oil fluid L in the other side chamber 142 to flow into the one side chamber 141 via the passage between the piston ring 95A and the second piston flange part 213, the passages in the plurality of axial grooves 235, and the passage in the passage groove 232. Thereby, a damping force on movement of the piston rod 21 in a compression direction reduces.

In the second piston 91A, when the piston ring 95A is separated from the rod guide 51 by a predetermined distance during the compression stroke from a state in which the piston ring 95A is on the rod guide 51 side with respect to all the grooves 87 in the second cylinder 4, the grooves 87 provided in the second cylinder 4 open. Then, the oil fluid L flows through the grooves 87 in addition to the flow through the passage between the piston ring 95A and the second piston flange part 213, the passages in the plurality of axial grooves 235, and the passage in the passage groove 232, thereby reducing the damping force on movement of the piston rod 21 in the compression direction. At that time, as the second piston 91A becomes further away from the rod guide 51, among the plurality of grooves 87, the number of the grooves 87 through which the oil fluid L flows increases. Thereby, the damping force on the movement of the piston rod 21 in the compression direction reduces in stages.

Next, main operations of the cylinder device 1A will be described.

"Extension stroke in which piston rod 21 is within second predetermined range in which piston ring 95A of second piston 91A is fitted into second cylinder 4"

In this extension stroke, the first piston assembly 17 illustrated in FIG. 1 operates in the same manner as in the first predetermined range. In addition, the second piston 91A of the second piston assembly 90A illustrated in FIG. 9 moves in a direction toward the rod guide 51 in the axial direction of the first cylinder 3 to cause the piston ring 95A to enter the inside of the second cylinder 4. Then, at the beginning thereof, the piston ring 95A closes the passage between itself and the second piston flange part 213 of the second piston main body 200.

With the piston ring 95A closing the passage between itself and the second piston flange part 213 in this manner, the second piston 91A moves to the rod guide 51 side. Then, the oil fluid L of the one side chamber 141 in the second cylinder 4 flows into the other side chamber 142 after being squeezed by the plurality of grooves 87 provided in the second cylinder 4. Therefore, a damping force generated by the second cylinder 4 and the second piston 91A increases. At that time, as the second piston 91A approaches the rod guide 51, among the plurality of grooves 87, the number of the grooves 87 through which the oil fluid L flows decreases and eventually becomes zero. Thereby, the damping force generated increases in stages, and the damping force on the movement of the piston rod 21 in an extension direction increases in stages.

When a pressure in the one side chamber 141 becomes higher than a pressure in the other side chamber 142 by a predetermined value or more while the second piston assembly 90A slides to the extension side in the second cylinder 4, the valve body 120 of the second piston assembly 90A opens to allow the oil fluid L of the one side chamber 141 to flow into the other side chamber 142 through the communication passage 248 while generating a damping force.

An amount of the damping force generated by the stopper mechanism 81A increases with respect to the damping force generated by the first piston assembly 17.

"Compression stroke in which piston rod 21 is within second predetermined range"

In this compression stroke, the first piston assembly 17 illustrated in FIG. 1 operates in the same manner as in the first predetermined range. In addition, the second piston 91A of the second piston assembly 90A illustrated in FIG. 9 moves in a direction away from the rod guide 51. Then, at the beginning thereof, the piston ring 95A opens the passage between itself and the second piston flange part 213 of the second piston main body 200.

With the piston ring 95A opening the passage between itself and the second piston flange part 213 as described above, the second piston 91A moves in a direction away from the rod guide 51. Then, the oil fluid L flows from the other side chamber 142 to the one side chamber 141 via the passage between the piston ring 95A and the second piston flange part 213, the passages in the plurality of axial grooves 235, and the passage in the passage groove 232. When the piston ring 95A of the second piston 91A passes the position of the grooves 87 provided in the second cylinder 4 from a state in which it is on the rod guide 51 side with respect to all the grooves 87 provided in the second cylinder 4, the oil fluid L flows from the other side chamber 142 to the one side chamber 141 through the grooves 87 in addition to the flow through the passage between the piston ring 95A and the second piston flange part 213, the passages in the plurality of axial grooves 235, and the passage in the passage groove 232. At that time, as the second piston 91A becomes further away from the rod guide 51, among the plurality of grooves 87, the number of the grooves 87 through which the oil fluid L flows increases. Thereby, the damping force on the movement of the piston rod 21 in the compression direction reduces in stages.

In the cylinder device 1A of the second embodiment, the stopper mechanism 81A includes the second cylinder 4 provided on the first end portion 3a side of the first cylinder 3 and having a smaller diameter than the first cylinder 3, and the second piston 91A provided to be movable according to movement of the piston rod 21 and able to fit into the second cylinder 4. Then, one end of the second piston 91A on the first end portion 3a side comes into contact with the first rod flange part 33 between the rod first outer diameter part 31 of the piston rod 21 and the rod second outer diameter part 32 having a smaller diameter than the rod first outer diameter part 31. Also, the other end of the second piston 91A on a side opposite to the first end portion 3a is biased by the nut 124 that biases the second piston 91A toward the rod flange part 33. Thereby, since the cylinder device 1A has a structure in which the nut 124 biases the other end of the second piston 91A on a side opposite to the first end portion 3a, which receives a high pressure from the first end portion 3a side when the stopper mechanism 81A operates, in a direction of the first rod flange part 33, that is, in a direction that resists the high pressure, durability can be enhanced.

In the cylinder device 1A, the second piston 91A includes the communication passage 248 provided to allow communication between the one side chamber 141 on the first end portion 3a side with respect to the second piston 91A in the second cylinder 4 and the other side chamber 142 on a side opposite to the first end portion 3a with respect to the second piston 91 in the second cylinder 4 when the second piston 91A is positioned inside the second cylinder 4. Also, in the cylinder device 1A, the valve body 120 that opens when a pressure in the one side chamber 141 reaches a predetermined pressure to allow communication between the one side chamber 141 and the other side chamber 142 through the communication passage 248 is provided on the other side chamber 142 side of the second piston 91A. Therefore, in the cylinder device 1A, since the valve body 120 opens when the pressure in the one side chamber 141 reaches the predetermined pressure to allow the oil fluid L to flow from the one side chamber 141 to the other side chamber 142 through the communication passage 248, the durability can be further enhanced.

In the cylinder device 1A, since the second piston 91A is biased toward the rod flange part 33 by the first male screw part 42 formed on the rod second outer diameter part 32 and the nut 124 screwed onto the first male screw part 42, the durability can be enhanced with a simple structure.

The cylinder device 1A includes the piston ring 95A provided around an outer circumference of the second piston 91A to be movable in the axial direction, and the second piston flange part 213 on a side opposite to the first end portion 3a and the ring member 201 on the first end portion 3a side that restrict a movement range of the piston ring 95A in the axial direction. Thereby, the movement range of the piston ring 95A in the axial direction can be restricted.

In the cylinder device 1A, the second piston 91A restricts the movement range of the piston ring 95A in the axial direction with the second piston flange part 213 of the second piston main body 200 in which the second piston flange part 213 is formed on a side opposite to the first end portion 3a and the fitting groove 231 is formed on the first end portion 3a side, and the ring member 201 fitted into the fitting groove 231. Therefore, the movement range of the piston ring 95A in the axial direction can be restricted with a simple structure.

In the embodiments described above, a case in which the second pistons 91 and 91A are biased to the first rod flange part 33 side to be pressed against the first rod flange part 33 by the first male screw part 42 of the piston rod 21 and the nut 124 screwed thereon has been described as an example, but the second pistons 91 and 91A may be biased to the first rod flange part 33 side to be pressed against the first rod flange part 33 by a spring supported by the piston rod 21. Alternatively, the second pistons 91 and 91A may be biased to the first rod flange part 33 side to be pressed against the first rod flange part 33 by a C-shaped ring attached to the piston rod 21.

Also, in the embodiments described above, a case in which the second cylinder 4 that is separate from the first cylinder 3 and has a smaller diameter than the first cylinder 3 is provided on the first end portion 3a side of the first cylinder 3 has been described as an example, but the second cylinder 4 having a smaller diameter than the first cylinder 3 may be provided on the first end portion 3a side of the first cylinder 3 integrally with the first cylinder 3 by bulge forming.

Also, in the embodiments described above, the extension-side stopper mechanism 81 and 81A that operate when the piston rod 21 reaches a predetermined position on the first end portion 3a side of one axial end of the first cylinder 3 on the extension side in the extension stroke have been described as an example, but the present invention is also applicable to a compression-side stopper mechanism that operates when the piston rod 21 reaches a predetermined position on a first end portion side of the other axial end of the first cylinder 3 on the compression side in the compression stroke.

REFERENCE SIGNS LIST

- 1, 1A Cylinder device
- 3 First cylinder
- 3a First end portion
- 4 Second cylinder
- 18 First piston
- 21 Piston rod
- 31 Rod first outer diameter part
- 32 Rod second outer diameter part
- 33 First rod flange part (rod flange part)
- 42 First male screw part (biasing part, screw)
- 81, 81A Stopper mechanism
- 91, 91A Second piston
- 92 Third piston (first restriction part)
- 93 Fourth piston
- 95, 95A Piston ring
- 113 Fourth piston flange part (second restriction part)
- 118, 248 Communication passage
- 120 Valve body
- 124 Nut (biasing part)
- 141 One side chamber
- 142 The other side chamber
- 200 Second piston main body
- 201 Ring member (second restriction part)
- 213 Second piston flange part (first restriction part)
- 231 Fitting groove (groove)

The invention claimed is:

1. A cylinder device comprising:
a first cylinder in which a working fluid is sealed;
a first piston fitted in the first cylinder to be slidable and partitioning an inside of the first cylinder;
a piston rod connected to the first piston; and
a stopper mechanism operating when the first piston reaches a predetermined position on a first end portion side of one axial end of the first cylinder during an extension stroke or a compression stroke, wherein
the stopper mechanism includes:
a second cylinder provided on the first end portion side of the first cylinder and having a smaller diameter than the first cylinder; and
a second piston provided to be movable according to movement of the piston rod and able to fit into the second cylinder,
one end of the second piston on the first end portion side comes into contact with a rod flange part between a rod first outer diameter part of the piston rod and a rod second outer diameter part having a smaller diameter than the rod first outer diameter part, and
the other end of the second piston on a side opposite to the first end portion is biased by a biasing part which biases the second piston toward the rod flange part.

2. The cylinder device according to claim 1, wherein the rod first outer diameter part and the rod second outer diameter part are integrally formed.

3. The cylinder device according to claim 1, wherein
the second piston includes a communication passage provided to allow communication between one side chamber on the first end portion side with respect to the second piston in the second cylinder and the other side chamber on a side opposite to the first end portion with respect to the second piston in the second cylinder when the second piston is positioned in the second cylinder, and
a valve body which opens when a pressure in the one side chamber reaches a predetermined pressure to allow communication between the one side chamber and the other side chamber through the communication passage is provided on the other side chamber side of the second piston.

4. The cylinder device according to claim 1, wherein the biasing part is constituted by a screw formed on the rod second outer diameter part and a nut screwed onto the screw.

5. The cylinder device according to claim 1, wherein the second piston includes:
a piston ring provided around an outer circumference thereof to be movable in an axial direction; and
a first restriction part on a side opposite to the first end portion and a second restriction part on the first end portion side which restrict a movement range of the piston ring in the axial direction.

6. The cylinder device according to claim 5, wherein
the second piston includes a third piston and a fourth piston whose outer diameter on the third piston side is smaller than an outer diameter of the third piston,
the third piston is the first restriction part, and
a fourth piston flange part formed on a side of the fourth piston opposite to the third piston is the second restriction part.

7. The cylinder device according to claim 5, wherein
the second piston includes a second piston main body in which a second piston flange part is formed on a side opposite to the first end portion and a groove is formed on the first end portion side,
the second piston flange part is the first restriction part, and
a ring member fitted into the groove is the second restriction part.

* * * * *